United States Patent
Ohno et al.

(10) Patent No.: US 7,882,161 B2
(45) Date of Patent: Feb. 1, 2011

(54) FILE MANAGEMENT APPARATUS AND METHOD, PROGRAM THEREFORE, AND RECORDING MEDIUM

(75) Inventors: Masayoshi Ohno, Tokyo (JP); Haruo Yoshida, Kanagawa (JP); Shigeru Kashiwagi, Tokyo (JP); Mitsuhiro Hirabayashi, Tokyo (JP); Osamu Date, Saitama (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 11/359,399

(22) Filed: Feb. 23, 2006

(65) Prior Publication Data

US 2006/0195486 A1 Aug. 31, 2006

(30) Foreign Application Priority Data

Feb. 25, 2005 (JP) ............................. 2005-052145

(51) Int. Cl.
*G06F 12/00* (2006.01)
*G06F 17/30* (2006.01)

(52) U.S. Cl. ...................................... 707/823; 707/830
(58) Field of Classification Search ........................ None
See application file for complete search history.

(56) References Cited

U.S. PATENT DOCUMENTS

| | | | | | |
|---|---|---|---|---|---|
| 5,093,779 | A | * | 3/1992 | Sakurai | 707/797 |
| 5,493,649 | A | * | 2/1996 | Slivka et al. | 714/48 |
| 5,634,048 | A | * | 5/1997 | Ryu et al. | 1/1 |
| 5,940,853 | A | * | 8/1999 | Ooi et al. | 711/111 |
| 6,272,649 | B1 | * | 8/2001 | Hayward et al. | 714/6 |
| 6,282,536 | B1 | * | 8/2001 | Day et al. | 719/328 |
| 6,314,418 | B1 | * | 11/2001 | Namba | 707/2 |
| 6,366,933 | B1 | * | 4/2002 | Ball et al. | 715/203 |
| 6,454,708 | B1 | * | 9/2002 | Ferguson et al. | 600/300 |
| 6,594,740 | B1 | * | 7/2003 | Fukuda | 711/156 |
| 6,604,170 | B1 | * | 8/2003 | Suzuki | 711/111 |
| 6,721,489 | B1 | | 4/2004 | Benyamin et al. | |
| 6,862,604 | B1 | * | 3/2005 | Spencer et al. | 707/205 |
| 2001/0051954 | A1 | * | 12/2001 | Yamashita | 707/200 |
| 2002/0107877 | A1 | | 8/2002 | Whiting et al. | |
| 2002/0129007 | A1 | * | 9/2002 | Kobayashi et al. | 707/1 |
| 2003/0069902 | A1 | * | 4/2003 | Narang et al. | 707/203 |
| 2003/0105776 | A1 | * | 6/2003 | Hasuo et al. | 707/200 |

(Continued)

FOREIGN PATENT DOCUMENTS

JP 2004-252959 9/2004

(Continued)

*Primary Examiner*—Pierre M Vital
*Assistant Examiner*—Augustine Obisesan
(74) *Attorney, Agent, or Firm*—Oblon, Spivak, McClelland, Maier & Neustadt, L.L.P.

(57) ABSTRACT

The present invention provides a file management apparatus for managing files, recorded on a recording medium, on the basis of an index file including management information about the files, the apparatus including: a management status information holding unit for holding management status information indicative of a management status of the files in the index file; a recording status detecting unit for detecting a recording status of the files recorded on the recording medium; and an inconsistency detecting unit for detecting an inconsistency between the management status of the files in the index file and the recording status of the files recorded on the recording medium on the basis of the management status information and the recording status detected by the recording status detecting unit.

17 Claims, 20 Drawing Sheets

U.S. PATENT DOCUMENTS

| | | | |
|---|---|---|---|
| 2003/0135513 A1 | 7/2003 | Quinn et al. | |
| 2004/0033055 A1* | 2/2004 | Hasegawa et al. | 386/95 |
| 2004/0105331 A1* | 6/2004 | Kanai et al. | 365/202 |
| 2004/0107204 A1* | 6/2004 | Sakamoto | 707/101 |
| 2004/0172383 A1* | 9/2004 | Yoshida et al. | 707/2 |
| 2004/0172416 A1* | 9/2004 | Murakami et al. | 707/104.1 |
| 2004/0254949 A1* | 12/2004 | Amirthalingam | 707/101 |
| 2004/0267821 A1* | 12/2004 | Kiyama et al. | 707/200 |
| 2005/0013208 A1* | 1/2005 | Hirabayashi et al. | 369/27.01 |
| 2005/0149493 A1* | 7/2005 | Yamashita et al. | 707/2 |
| 2006/0117008 A1* | 6/2006 | Shimogori | 707/7 |

FOREIGN PATENT DOCUMENTS

| | | |
|---|---|---|
| WO | WO 00/78043 A1 | 12/2000 |
| WO | WO 03/058625 A1 | 7/2003 |

* cited by examiner

FIG. 4
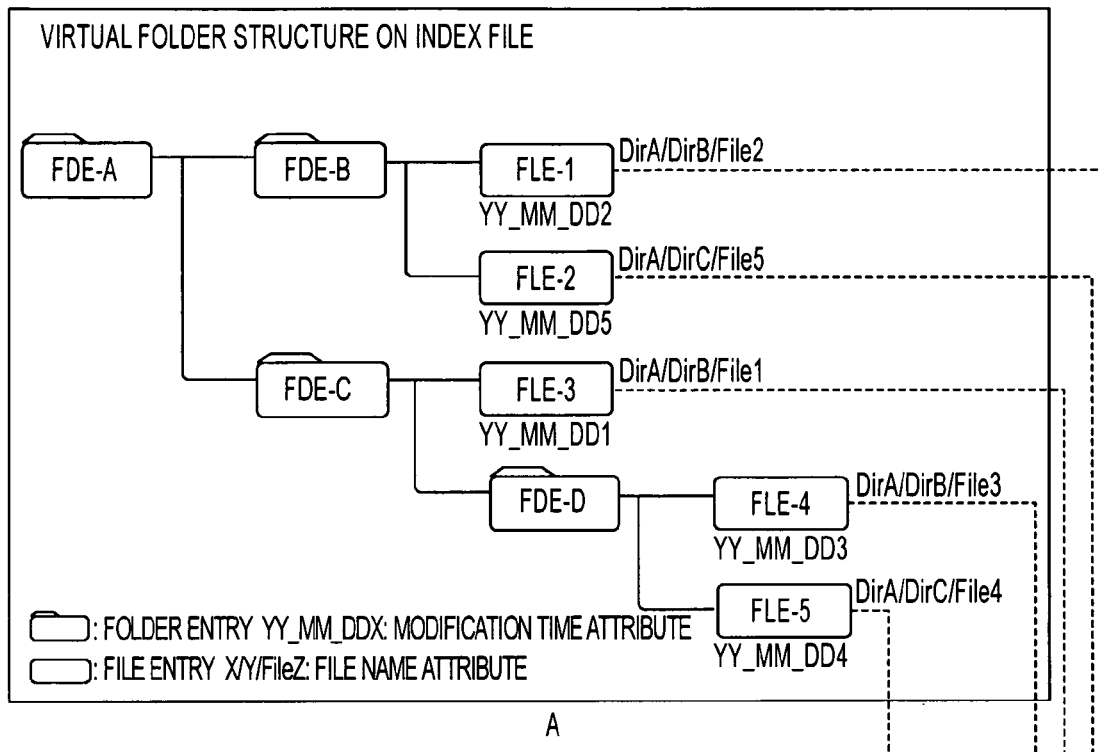
A
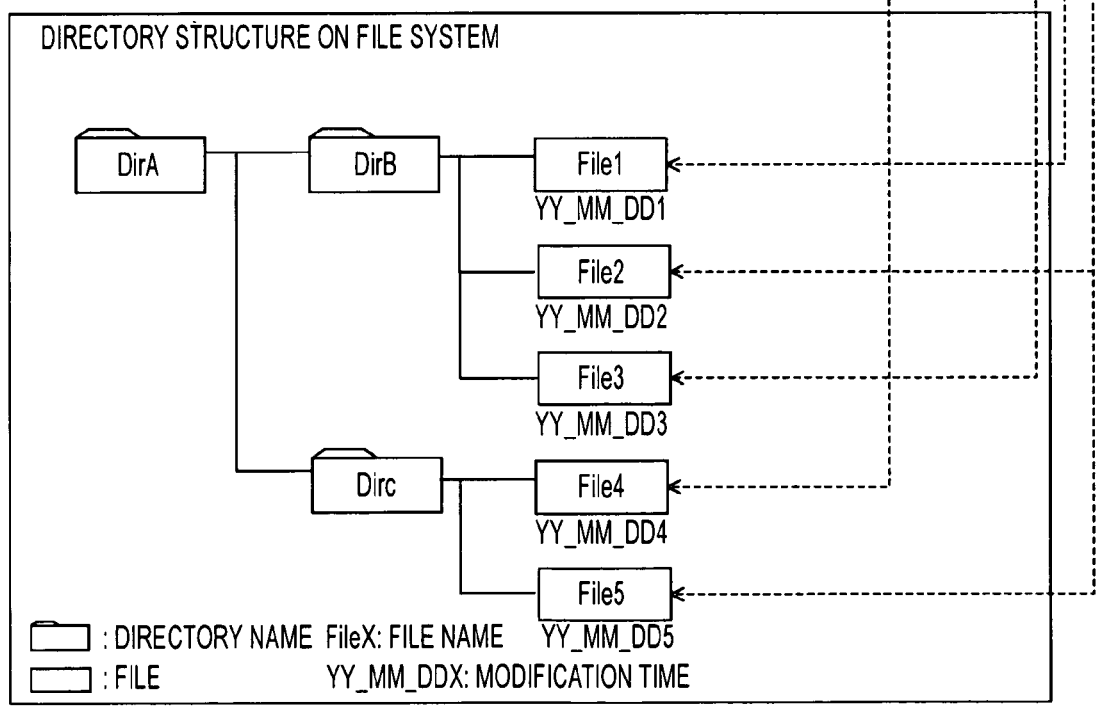
B

| RELATIVE BYTE POSITION | LENGTH | FIELD NAME |
|---|---|---|
| 0 | LAP1 | AV FILE PROPERTY #1 |
| LAP1 | LAP2 | AV FILE PROPERTY #2 |
| LAP1 + LAP2 | LAP3 | AV FILE PROPERTY #3 |
| ⋮ | ⋮ | ⋮ |
|  | LAPn | AV FILE PROPERTY #n |

| RELATIVE BYTE POSITION | LENGTH | FIELD NAME |
|---|---|---|
| 0 | LAT1 | AV FILE TEXT #1 |
| LAT1 | LAT2 | AV FILE TEXT #2 |
| LAT1 + LAT2 | LAT3 | AV FILE TEXT #3 |
| ⋮ | ⋮ | ⋮ |
|  | LATn | AV FILE TEXT #n |

| RELATIVE BYTE POSITION | LENGTH | FIELD NAME |
|---|---|---|
| 0 | LTH1 | AV FILE THUMBNAIL IMAGE #1 |
| LTH1 | LTH2 | AV FILE THUMBNAIL IMAGE #2 |
| LTH1 + LTH2 | LTH3 | AV FILE THUMBNAIL IMAGE #3 |
| ⋮ | ⋮ | ⋮ |
|  | LTHn | AV FILE THUMBNAIL IMAGE #n |

| RELATIVE BYTE POSITION | LENGTH | FIELD NAME |
|---|---|---|
| 0 | LIS1 | AV FILE INTRO #1 |
| LIS1 | LIS2 | AV FILE INTRO #2 |
| LIS1 + LIS2 | LIS3 | AV FILE INTRO #3 |
| ⋮ | ⋮ | ⋮ |
|  | LISn | AV FILE INTRO #n |

FIG. 10

| RBP | LENGTH | DATA |
|---|---|---|
| 0 | 16 | PROPERTY ENTRY HEADER |
| 16 | 32 | BASIC PROPERTY DATA |
| 56 | L P EX | PROPERTY EXTENSION DATA |

FIG. 11

| RBP | LENGTH | DATA |
|---|---|---|
| 0 | 2 | ENTRY NUMBER |
| 2 | 2 | PARENT ENTRY NUMBER |
| 4 | 2 | PROPERTY ENTRY FLAGS |
| 6 | 2 | PLAY ORDER |
| 8 | 4 | ENTRY DATA SIZE |
| 12 | 2 | NEXT-EXTENDS-ENTRY |
| 14 | 2 | RESERVED |

| Bit | FIELD NAME | |
|---|---|---|
| 15 : 14 | RESERVED | |
| 13 | INTRO-EXTENDS | 731 |
| 12 | THUMBNAIL-EXTENDS | 729 |
| 11 | TEXT-EXTENDS | 728 |
| 10 | PARENT FILE | 727 |
| 9 | CHILD FILE | 726 |
| 8 | REFERENCE | 725 |
| 7 : 5 | RESERVED | |
| 4 | VALID/INVALID | 724 |
| 3 | RESERVED | |
| 2 | EXTENDS | 723 |
| 1 | FILE/FOLDER | 722 |
| 0 | ORIGINAL/FAVORITE | 721 |

| RBP | LENGTH | FIELD NAME |
|---|---|---|
| 0 | 4 | FORMAT BRAND |
| 4 | 4 | MEDIA PROFILE |
| 8 | 2 | CONTENTS STATUS FLAG |
| 10 | 2 | RESERVED |
| 12 | 4 | CREATION TIME |
| 16 | 4 | MODIFICATION TIME |
| 20 | 4 | DURATION |
| 24 | 6 | BINARY FILE IDENTIFIER |
| 30 | 2 | REFERRED COUNTER |

| ENTRY NUMBER | | 0 | 1 | 2 | 3 | 4 | 5 | 6 | 7 |
|---|---|---|---|---|---|---|---|---|---|
| FILE/FOLDER | 0: FOLDER  1: FILE | 0 | 1 | 1 | 0 | 0 | 1 | 1 | 1 |
| PARENT ENTRY NUMBER | | x | 0 | 0 | 0 | 3 | 3 | 4 | 4 |
| BINARY FILE IDENTIFIER/URL | | x | File-a | File-b | x | x | File-c | File-d | File-e |

: FOLDER ENTRY          : FILE ENTRY
E-X : ENTRY NUMBER (X)

FIG. 15

| DIRECTORY NAME | NUMBER OF FILES | MODIFICATION TIME CHECKSUM | FILE NAME CHECKSUM |
|---|---|---|---|
| DirA | 0 | 00000000 | 00000000 |
| DirA/DirB | 3 | 00000001 | 00000010 |
| DirA/DirC | 2 | 00001010 | 00000110 |
| ⋮ | ⋮ | ⋮ | ⋮ |

FIG. 17

| NAME | SIZE (byte) | DESCRIPTION | |
|---|---|---|---|
| timezone | 2 | 0: UTC, 1: local | → $T_{i1}$ (HIGH ORDER BYTE)<br>$T_{i2}$ (LOW ORDER BYTE) |
| year | 2 | YEAR (1 TO 999) | → $T_{i3}$ (HIGH ORDER BYTE)<br>$T_{i4}$ (LOW ORDER BYTE) |
| month | 1 | MONTH (1 TO 12) | → $T_{i5}$ |
| day | 1 | DAY (1 TO 30) | → $T_{i6}$ |
| hour | 1 | HOUR (0 TO 23) | → $T_{i7}$ |
| min | 1 | MINUTE (0 TO 59) | → $T_{i8}$ |
| sec | 1 | SECOND (0 TO 59) | → $T_{i9}$ |
| centisec | 1 | CENTISECOND (0 TO 99) | → $T_{i10}$ |
| microsec100 | 1 | HUNDRED MICROSECOND (0 TO 99) | → $T_{i11}$ |
| microsec | 1 | MICROSECOND (0 TO 99) | → $T_{i12}$ |

FILE MANAGEMENT APPARATUS AND METHOD, PROGRAM THEREFORE, AND RECORDING MEDIUM

CROSS REFERENCES TO RELATED APPLICATIONS

The present invention contains subject matter related to Japanese Patent Application JP 2005-052145 filed in the Japanese Patent Office on Feb. 25, 2005, the entire contents of which are incorporated herein by reference.

BACKGROUND OF THE INVENTION

1. Field of the Invention

The present invention relates to file management apparatuses and, in particular, to file management apparatuses each managing files, which are recorded on a recording medium, on the basis of an index file, and more particularly, relates to a file management apparatus and method for determining whether an inconsistency exists between a management status of files included in an index file and a recording status of files recorded on a recording medium, a program that allows a computer to execute the method, and a recording medium on which management status information used to determine whether the inconsistency exists is recorded.

2. Description of the Related Art

Recently, digital versatile discs (DVDs) have come along. In addition, flash memories are increasing in capacity. The use of those large-capacity recording media allow relatively small imaging devices, such as digital camcorders, digital still cameras, and mobile cellular phones, to record captured images as a large number of content files.

As the number of content files recorded on a recording medium increases, it is more difficult for a user to retrieve a desired content file. Japanese Unexamined Patent Application Publication No. 2004-227630 discloses a method for creating an index file to compile attribute information related to content files as management information (index information) about the respective content files and managing the content files recorded on a recording medium using the index file. A user can manage the content files in a virtual folder structure using the index file. The usability of large number of files can be improved.

SUMMARY OF THE INVENTION

In managing the files on the basis of the above-mentioned index file, it is necessary to generate management information every file to be managed and update the contents of the index file in response to the addition, deletion, or editing of a file to be managed. Generally, the index file is updated through application software to manage the index file. Under general conditions, therefore, each management information unit included in the index file corresponds to any of the managed content files. The management status of the files in the index file is consistent with a recording status of the files recorded on the recording medium at every time.

However, if the user directly deletes, adds, or edits a content file in a file system through a personal computer (PC) without using the application software, the index file may not reflect the operation. In other words, the index file may include management information about the deleted content file. On the other hand, when management information about the added content file is not added to the index file, alternatively, when the index file does not reflect the changed file name, management information units included in the index file do not correspond to the respective content files actually recorded on the recording medium in a one-to-one relationship. Disadvantageously, the contents of the index file, i.e., the management status of the content files in the index file may be inconsistent with the recording status of the content files recorded on the recording medium.

To determine whether an inconsistency exists between the management status and the recording status, it is necessary to check the files recorded on the recording medium against the management information about the files contained in the index file. Unfortunately, it takes much time to check the files against the management information.

It is desirable to provide a file management apparatus and method capable of determining whether an inconsistency exists between the contents of an index file and a recording status of files recorded on a recording medium at high speed, a program allowing a computer to execute the method, and a recording medium on which management status information to determine whether the inconsistency exists is recorded.

The present invention is made to solve the above-mentioned disadvantages. According to an embodiment of the present invention, there is provided a file management apparatus for managing files, recorded on a recording medium, on the basis of an index file including management information about the files, the apparatus including: a management status information holding unit for holding management status information indicative of a management status of the files in the index file; a recording status detecting unit for detecting a recording status of the files recorded on the recording medium; and an inconsistency detecting unit for detecting an inconsistency between the management status of the files in the index file and the recording status of the files recorded on the recording medium on the basis of the management status information and the recording status detected by the recording status detecting unit. Advantageously, when it is determined whether an inconsistency exists between the management status of the files in the index file (i.e., the contents of the index file) and the recording status of the files recorded on the recording medium, the inconsistency can be detected on the basis of the management status information at high speed without checking a management information unit about each file included in the index file against the corresponding file.

According to this embodiment, the management status information holding unit may hold the management status information about the files every directory, the files being recorded in a directory structure on the recording medium. Accordingly, whether the inconsistency exists can be determined every directory on the basis of the management status information.

In this instance, the management status information may include information regarding the number of files included in each directory. Therefore, when an inconsistency between the contents of the index file and the actual recording status of the files occurs by adding or deleting a file, the inconsistency can be detected at high speed.

In addition, the management status information may include information regarding the modification times of the files included in each directory. Accordingly, when an inconsistency between the contents of the index file and the actual recording status of the files occurs by adding, deleting, overwriting, or editing a file, the inconsistency can be detected at high speed.

In this instance, the information regarding the modification times of the files may be a checksum for each directory. The checksum is generated on the basis of the modification times of the files included in each directory. Consequently, the inconsistency can be detected at high speed.

Further, the management status information may include information regarding the names of the files included in each directory. Advantageously, when an inconsistency between the contents of the index file and the actual recording status of the files occurs by adding or deleting a file or changing the name of a file, the inconsistency can be detected at high speed.

In this instance, the information regarding the file names may be a checksum for each directory. The checksum is generated on the basis of the names of the files included in each directory. Consequently, the inconsistency can be detected at high speed.

In addition, the management status information may include information regarding the creation time of the most recently created file in each directory. Accordingly, when an inconsistency between the contents of the index file and the actual recording status of the files occurs by adding a file, the inconsistency can be detected at high speed.

Further, the management status information may include information regarding the modification time of the last modified file in each directory. Advantageously, even when an inconsistency between the contents of the index file and the actual recording status of the files occurs by editing any of the files, the inconsistency can be detected at high speed.

According to this embodiment of the present invention, the file management apparatus may further include a management status information generating unit for generating the management status information from the management information. Accordingly, the management status information can be updated in agreement with the modified management information included in the index file, the modification being caused by adding or deleting a file or changing the name of a file.

In this instance, the management status information generating unit may generate the management status information about the files every directory, the files being recorded in a directory structure on the recording medium. Consequently, whether the inconsistency exists can be determined every directory on the basis of the management status information.

Further, the management information may be generated from the files recorded on the recording medium. In this instance, the management status information may be generated from the management information. The management status information may be generated from the management information included in the index file.

According to another embodiment of the present invention, there is provided a file management apparatus for managing files, recorded on a recording medium, on the basis of an index file including management information about the files, the apparatus including: a management status information holding unit for holding at least two kinds of management status information units indicating a management status of the files in the index file; a recording status detecting unit for detecting at least two kinds of recording statuses of the files recorded on the recording medium so that the recording statuses correspond to the at least two kinds of management status information units, respectively; and an inconsistency detecting unit for detecting an inconsistency between the management information included in the index file and the recording status of the files recorded on the recording medium on the basis of each management status information unit and the corresponding recording status detected by the recording status detecting unit. Accordingly, when it is determined whether an inconsistency exists between the contents of the index file and the recording status of the files recorded on the recording medium, the inconsistency can be detected on the basis of the management status information at high speed without checking a management information unit about each file included in the index file against the corresponding file. In this instance, whether the inconsistency exists is determined on the basis of at least two kinds of management status information units. Advantageously, the precision of the determination can be increased.

According to this embodiment of the present invention, the management status information about the files, recorded in a directory structure on the recording medium, may be held every directory. Thus, whether the inconsistency exists can be determined every directory on the basis of the management status information.

Further, the management status information may include at least two of information regarding the number of files managed in the index file, information regarding the names of the files, and information regarding the modification times of the respective files. Consequently, when the number of files is changed by adding or deleting a file, when the number of files is not changed by adding a file and deleting any of the files, alternatively, when an inconsistency between the contents of the index file and the actual recording status of the files occurs by overwriting any of the files, changing the name of any file, or editing any file, the inconsistency can be detected with high precision at high speed.

According to another embodiment of the present invention, there is provided a file management method for managing files, recorded on a recording medium, on the basis of an index file including management information about the files, the method including the steps of; previously holding management status information indicative of a management status of the files in the index file; detecting a recording status of the files recorded on the recording medium; and detecting an inconsistency between the management status of the files in the index file and the recording status of the files recorded on the recording medium on the basis of the management status information and the detected recording status. Accordingly, when it is determined whether an inconsistency exists between the contents of the index file and the recording status of the files recorded on the recording medium, the previously held management status information may be referred to without checking a management information unit about each file included in the index file against the corresponding file. Advantageously, the inconsistency can be detected at high speed.

According to another embodiment of the present invention, there is provided a program for managing files, recorded on a recording medium, on the basis of an index file including management information about the files, the program allowing a computer to execute a process including the steps of: previously holding management status information indicative of a management status of the files in the index file; detecting a recording status of the files recorded on the recording medium; and detecting an inconsistency between the management status of the files in the index file and the recording status of the files recorded on the recording medium on the basis of the management status information and the detected recording status. Accordingly, when it is determined whether an inconsistency exists between the contents of the index file and the recording status of the files recorded on the recording medium, the previously held management status information may be referred to without checking a management information unit about each file included in the index file against the corresponding file. Advantageously, the inconsistency can be detected at high speed.

According to further another embodiment of the present invention, there is provided a recording medium storing an index file including management information about files recorded thereon, wherein management status information about the files is recorded on the recording medium, the management status information being used to determine whether a management status of the files in the index file is inconsistent with a recording status of the files recorded on the recording medium. Accordingly, when it is determined whether an inconsistency exists between the contents of the index file and the recording status of the files recorded on the recording medium, the previously held management status information may be referred to without checking a management information unit about each file included in the index file against the corresponding file. Thus, the inconsistency can be detected at high speed.

Advantageously, according to the present invention, whether an inconsistency exists between the contents of the index file and the recording status of the files can be determined at high speed.

BRIEF DESCRIPTION OF THE DRAWINGS

FIG. 4 shows an example of the arrangement of content files 210 managed by the file management apparatus 160;

FIGS. 9A to 9D show respective examples of a property track atom 520, a text track atom 530, a thumbnail track atom 540, and an intro track atom 550 allocated to the index atom 500;

FIG. 10 shows an example of the structure of a property 700 included in the index data atom 600;

FIG. 11 shows an example of the structure of a property entry header 710 included in the property 700;

FIG. 12 shows an example of the structure of property entry flags 720 included in the property entry header 710;

FIG. 13 shows an example of the structure of basic property data 740 included in the property 700;

FIGS. 14A and 14B show another example of the arrangement of content files 210 managed by the file management apparatus 160;

FIG. 15 shows an example of the structure of inconsistency detection information 800 used by the file management apparatus 160;

FIG. 17 is a diagram explaining the method for generating the modification time checksum 820;

DESCRIPTION OF THE PREFERRED EMBODIMENTS

Embodiments of the present invention will now be described in detail with reference to the drawings.

Figure 1:
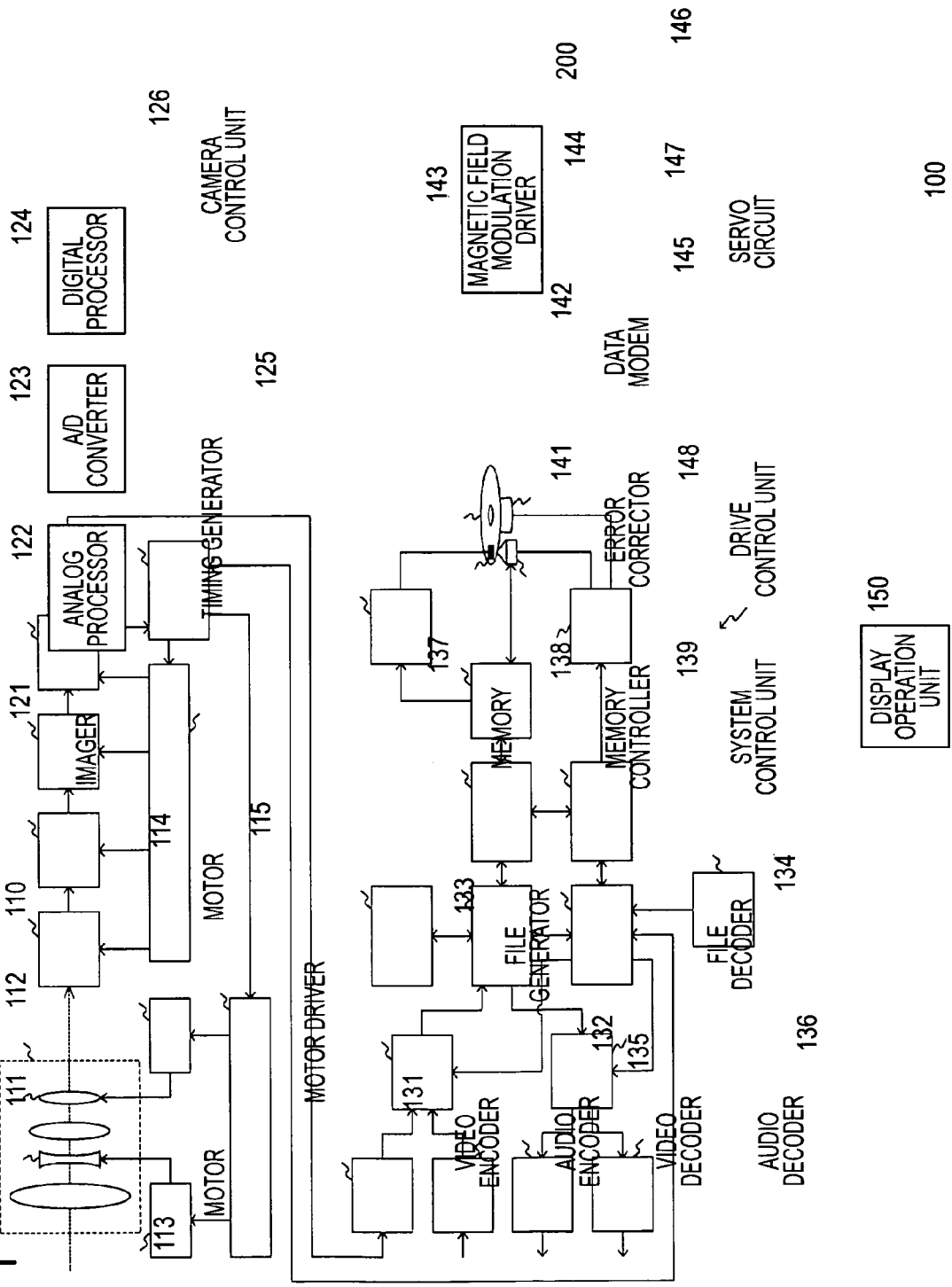
FIG. 1 is a block diagram of the structure of a video recording apparatus 100 to which a file management apparatus according to an embodiment of the present invention is applied.

FIG. 1 is a diagram of the entire structure of a video recording apparatus 100 to which a file management apparatus according to an embodiment of the present invention is applied. The video recording apparatus 100 captures still images and moving images and records the captured images as content files on a recording medium 200. According to the present embodiment, the file management apparatus manages content files recorded on the recording medium 200 on the basis of an index file, which will be described below. The file management apparatus will also be described below.

The video recording apparatus 100 includes a lens unit 110, motors 113 and 114 for operating the lens unit 110, and a motor driver 115. The video recording apparatus 100 further includes an imager 121, an analog processor 122, an analog-to-digital (A/D) converter 123, a digital processor 124, a timing generator 125 for generating timing signals for the above components, and a camera control unit 126. In addition, the video recording apparatus 100 includes a video encoder 131, an audio encoder 132, a file generator 133, a file decoder 134, a video decoder 135, an audio decoder 136, a memory 137, a memory controller 138, and a system control unit 139. The system control unit 139 is connected with a signal line extending from a display operation unit 150. The video recording apparatus 100 further includes an error corrector 141, a data modulator/demodulator (modem) 142, a magnetic field modulation driver 143, a magnetic field head 144, a servo circuit 145, a motor 146, an optical pickup 147, and a drive control unit 148. A recording medium to store video images, e.g., the recording medium 200 is mounted on the video recording apparatus 100.

The lens unit 110 receives light from an object and includes a zoom lens 111 and a focus lens 112. The zoom lens 111 and the focus lens 112 are connected to the motors 113 and 114, respectively, in a manner such that the zoom lens 111 is movable by driving the motor 113 and the focus lens 112 is movable by driving the motor 114. The motors 113 and 114 are connected to the motor driver 115 which controls the motors 113 and 114.

The imager 121 converts light received through the lens unit 110 into electrostatic energy to store the energy. For instance, a charge coupled device (CCD) or a complementary metal oxide semiconductor (CMOS) sensor can be used as the imager 121. The analog processor 122 eliminates noise from analog signals of the imager 121 by correlated double sampling (CDS) and compensates analog signal level changes by automatic gain control (AGC). The A/D converter 123 converts analog signals supplied from the analog processor 122 into digital signals. The digital processor 124 performs processing, such as white balance processing and gamma correction processing.

Output signals of the digital processor 124 are supplied as video signals to the video encoder 131. Information detected by the digital processor 124 is transmitted to the camera control unit 126. The camera control unit 126 controls the motor driver 115 and the timing generator 125 on the basis of the information detected by the digital processor 124. The timing generator 125 generates timing signals to be supplied to the imager 121, the analog processor 122, the A/D converter 123, and the digital processor 124.

The video encoder 131 encodes video signals. The audio encoder 132 encodes audio signals. The file generator 133 combines encoded video data with encoded audio data to generate a content file (multiplexed data). The file decoder 134 decodes a content file to output video data and audio data. The video decoder 135 decodes video data to output video signals. The audio decoder 136 decodes audio data to output audio signals.

In FIG. 1, an input signal supplied to the audio encoder 132 and output signals of the video decoder 135 and the audio decoder 136 are not shown. An audio input signal is supplied to the audio encoder 132. The video decoder 135 outputs a video output signal and the audio decoder 136 outputs an audio output signal.

The memory 137 stores a program which runs on the video recording apparatus 100. The memory 137 serves as a main memory for the system control unit 139, which will be described below. The memory controller 138 writes multiplexed data supplied from the file generator 133 or the error corrector 141 into the memory 137. In addition, the memory controller 138 reads multiplexed data from the memory 137 and supplies the data to the error corrector 141 or the file decoder 134.

The system control unit 139 controls the whole operation of the video recording apparatus 100 and includes, e.g., a processor. The system control unit 139 controls the respective operations of the memory controller 138, the file generator 133, and the file decoder 134. The system control unit 139 is connected to the drive control unit 148 to operate a disk drive through the drive control unit 148. In addition, the system control unit 139 is connected to the camera control unit 126 to obtain information about the status of the zoom lens 111 and focus lens 112, e.g., information indicating whether the autofocus function is activated, or information regarding the focal length.

The system control unit 139 is further connected to the display operation unit 150. The display operation unit 150 is used to display an image captured by the video recording apparatus 100 or to grasp an instruction input by a user. The display operation unit 150 includes various keys, e.g., a shutter key, a zoom control key, and a mode selection key. The shutter key and the zoom control key are used to capture an image with the video recording apparatus 100. The mode selection key is used to switch the video recording apparatus 100 between an image capture mode and a play mode for content file playback. In addition, the display operation unit 150 displays thumbnail images included in an index file, which will be described below, to receive a user's selection, so that a content file corresponding to the selected thumbnail image can be played back. The display operation unit 150 may include, e.g., a liquid crystal display panel and a touch panel.

When the user instructs to record captured images through the display operation unit 150, the system control unit 139 detects a free space in the recording medium 200 according to a file system of the recording medium 200 and records sequentially captured images as a content file 210 into the free space. In this instance, information necessary to generate an index file 220 is obtained from the content file 210. Simultaneously, the contents of the index file 220 held in the memory is updated.

The error corrector 141 adds a code for interleave or error correction to multiplexed data supplied from the memory controller 138 and inputs the resultant data to the data modem 142. The error corrector 141 performs deinterleaving and error correction processing to decoded signals supplied from the data modem 142 and then supplies the resultant multiplexed data to the memory controller 138.

The data modem 142 performs predetermined modulation processing to data so that the data can be recorded on the recording medium 200 and outputs the resultant data to the magnetic field modulation driver 143. Simultaneously, the data modem 142 outputs a signal to drive the optical pickup 147. In addition, the data modem 142 performs predetermined demodulation processing to signals from the optical pickup 147 and outputs the demodulated signals to the error corrector 141.

Upon recording, the magnetic field modulation driver 143 drives the magnetic field head 144 in response to an input signal to apply a magnetic field to the recording medium 200. The optical pickup 147 applies a laser beam for recording to the recording medium 200 to record signals on the recording medium 200. Upon playback, the optical pickup 147 applies a laser beam for playback to the recording medium 200 and converts light reflected from the recording medium 200 into electric signals to obtain playback signals. As for the above operations, in response to a request from the system control unit 139, the drive control unit 148 generates the request to the servo circuit 145 to control the entire disk drive. The servo circuit 145 controls a disk radial moving servo operation, a tracking servo operation, and a focus servo operation for the optical pickup 147 and also controls a spindle servo operation for the motor 146.

In the above-mentioned structure, it is assumed that the recording medium 200 is a magneto-optical disk to which magnetic field modulation is performed. When a phase change disk is used, the fundamental structure of the video recording apparatus is the same as the above. The recording media 200 are not limited to an optical disk and a magneto-optical disk. A semiconductor memory, such as a flash memory, may be used. The video recording apparatus 100 may include components appropriate to the type of recording medium 200.

Figure 2:
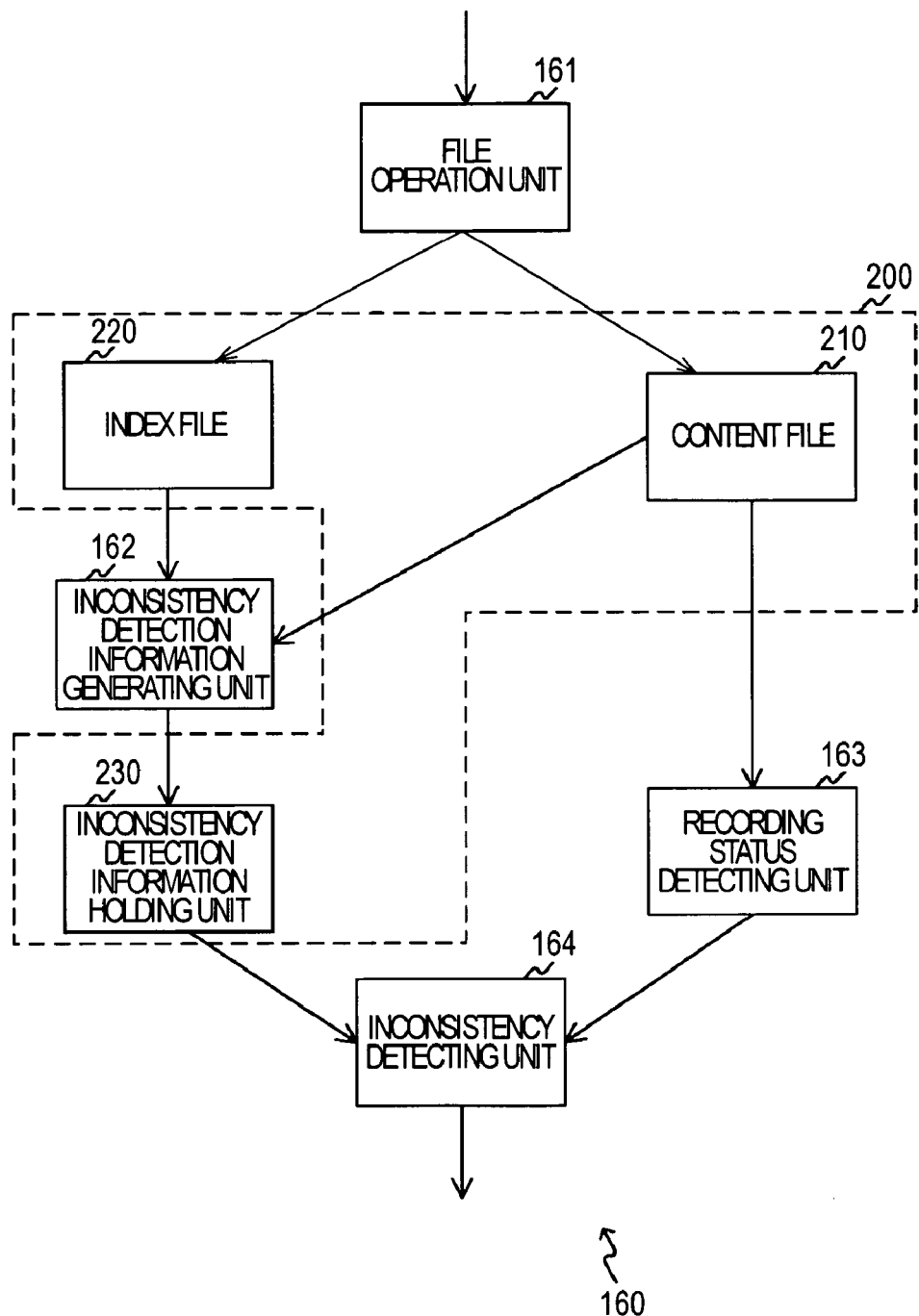
FIG. 2 is a block diagram of the functional structure of a file management apparatus 160 according to the embodiment of the present invention.

FIG. 2 shows essential functional components of a file management apparatus 160 according to the present embodiment of the present invention. The file management apparatus 160 manages the content files 210 recorded on the recording medium 200 on the basis of the index file 220 including management information about the content files 210. According to the present embodiment, the file management apparatus 160 can detect an inconsistency between the contents of the index file 220 and a recording status of the content files 210 recorded on the recording medium 200.

In this instance, management information to manage the content files 210 to be managed is allocated to the index file 220. As will be described below, the management information includes file property information, e.g., information regarding each file name, that regarding the creation time of each file, and that regarding the modification time of each file. An inconsistency between the contents of the index file 220 and the recording status of the content files 210 recorded on the recording medium 200 means that a management status of the content files 210 in the content file 210 is inconsistent with the recording status of the content files 210 recorded on the recording medium 200. For instance, when any of the content files 210 corresponding to the management information units included in the content file 210 is not recorded on the recording medium 200, when any of the management information units corresponding to the content files 210 recorded on the recording medium 200 is not included in the index file 220, alternatively, when the contents of each content file 210 recorded on the recording medium 200 are not consistent with the descriptions of the corresponding management information unit, the inconsistency exists between the management status and the recording status.

When the user adds a new content file 210 or deletes or edits any of the content files 210 through the video recording apparatus 100 according to the present embodiment, the contents of the index file 220 are updated in response to the user operation. A management information unit corresponding to the content file 210 is added to the index file 220, alternatively, the corresponding management information unit is deleted from or edited in the index file 220. Thus, the above-described inconsistency does not occur. However, when the user directly adds a new content file 210 or deletes or edits any of the content files 210 in the file system through a PC, the contents of the index file 220 are not updated. The inconsistency may occur. According to the present embodiment, the file management apparatus 160 can detect the inconsistency at high speed.

Referring to FIG. 2, the file management apparatus 160 includes a file operation unit 161, an inconsistency detection information generating unit 162, an inconsistency detection information holding unit 230, a recording status detecting unit 163, and an inconsistency detecting unit 164.

The file operation unit 161 receives various operation instructions for the file management apparatus 160. Through the file operation unit 161, the file management apparatus 160 can receive a signal to instruct the start of a process of generating inconsistency detection information, detecting the recording status of the content files 210 on the recording medium 200, and determining whether an inconsistency exists between the contents of the index file 220 and the actual recording status of the content files 210 recorded on the recording medium 200. The process including the above-mentioned series of steps will be referred to as an inconsistency detecting process, which will be described below.

The inconsistency detecting process may be started in response to a user's operation input to instruct the start of the inconsistency detecting process, the input being supplied through the display operation unit 150. Alternatively, the process may be automatically started at predetermined time. As for the time to execute the inconsistency detecting process, e.g., when the video recording apparatus 100 is powered on, alternatively, when the number of files is equal to or larger than a predetermined value, the process can be automatically started. In the case where the inconsistency detecting process is started in response to a user instruction, when the user wants to execute the process, whether an inconsistency exists between the contents of the index file 220 and the recording status of the content files 210 on the recording medium 200 can be determined. In the case where the inconsistency detecting process is simultaneously executed when the video recording apparatus 100 is turned on, whether an inconsistency exists therebetween can be determined without any user operation. In this instance, the larger the number of files becomes, the more easily the inconsistency occurs between the contents of the index file 220 and the recording status of the content files 210 recorded on the recording medium 200. Therefore, in the case where the inconsistency detecting process is executed at the time when the number of files is equal to or larger than a predetermined value, whether an inconsistency exists between the contents of the index file 220 and the recording status of the files 210 recorded on the recording medium 200 can be determined under circumstances where the inconsistency easily occurs.

The inconsistency detection information generating unit 162 generates inconsistency detection information (management status information). The inconsistency detection information indicates the management status of the content files 210 in the index file 220. The inconsistency detection information is generated when the index file 220 is generated. Each time the contents of the index file 220 are updated, the descriptions of the inconsistency detection information are also updated. The inconsistency detection information may be generated on the basis of the management information included in the index file 220. Alternatively, the inconsistency detection information may be generated on the basis of the management information which is extracted from the content files 210 in order to generate the index file 220. Alternatively, when the index file 220 is generated or updated, information necessary to generate the inconsistency detection information is directly extracted from the content files 210 to generate the inconsistency detection information. The inconsistency detection information generating unit 162 can generate a plurality of kinds of inconsistency detection information units based on items which the inconsistency may occur with respect to. Those kinds of inconsistency detection information units may include information regarding the number of files, information regarding the modification times of the files, information regarding the names of the files, and information regarding the creation times of the files.

When the content files 210 are recorded in a directory structure on the recording medium 200, the inconsistency detection information generating unit 162 generates the inconsistency detection information every directory.

The inconsistency detection information holding unit 230 holds the inconsistency detection information generated by the inconsistency detection information generating unit 162. The inconsistency detection information holding unit 230 can be provided for the recording medium 200. For example, the header of the index file 220 functions as the inconsistency detection information holding unit 230 such that the inconsistency detection information can be held in the header of the index file 220. The index file 220 will be described below.

The recording status detecting unit 163 detects the recording status of the content files 210 recorded on the recording medium 200. The recording status detecting unit 163 detects the recording status of the content files 210 such that the recording status corresponds to the kind of inconsistency detection information. For instance, when the inconsistency detection information is concerned with the number of files, the recording status detecting unit 163 detects the number of content files 210 recorded on the recording medium 200. When the inconsistency detection information is concerned with the modification times of the content files 210, the recording status detecting unit 163 detects the modification times of the content files 210 recorded on the recording medium 200. When the inconsistency detection information is about the names of the files, the recording status detecting unit 163 detects the names of the content files 210 recorded on the recording medium 200. When the inconsistency detection information is about the creation times of the files, the recording status detecting unit 163 detects the creation times of the content files 210 recorded on the recording medium 200.

In the case where the content files 210 are recorded in the directory structure on the recording medium 200, the recording status detecting unit 163 detects the recording status of the content files 210 belonging to each directory, i.e., every directory.

The inconsistency detecting unit 164 determines, on the basis of the inconsistency detection information held by the inconsistency detection information holding unit 230 and the recording status of the content files 210 on the recording medium 200 detected by the recording status detecting unit 163, whether an inconsistency exists between the contents of the index file 220 and the recording status of the content files 210 recorded on the recording medium 200.

The file operation unit 161, the inconsistency detection information generating unit 162, the recording status detecting unit 163, and the inconsistency detecting unit 164 can be realized as programs running on the system control unit 139 in the video recording apparatus 100. The file operation unit 161 can be realized as a program which runs on the system control unit 139 in response to an operation input supplied through the display operation unit 150. Each of the index file 220 and the content files 210 can be realized as a file recorded on the recording medium 200. The inconsistency detection information holding unit 230 can be provided at the header of the index file 220.

Figure 3:
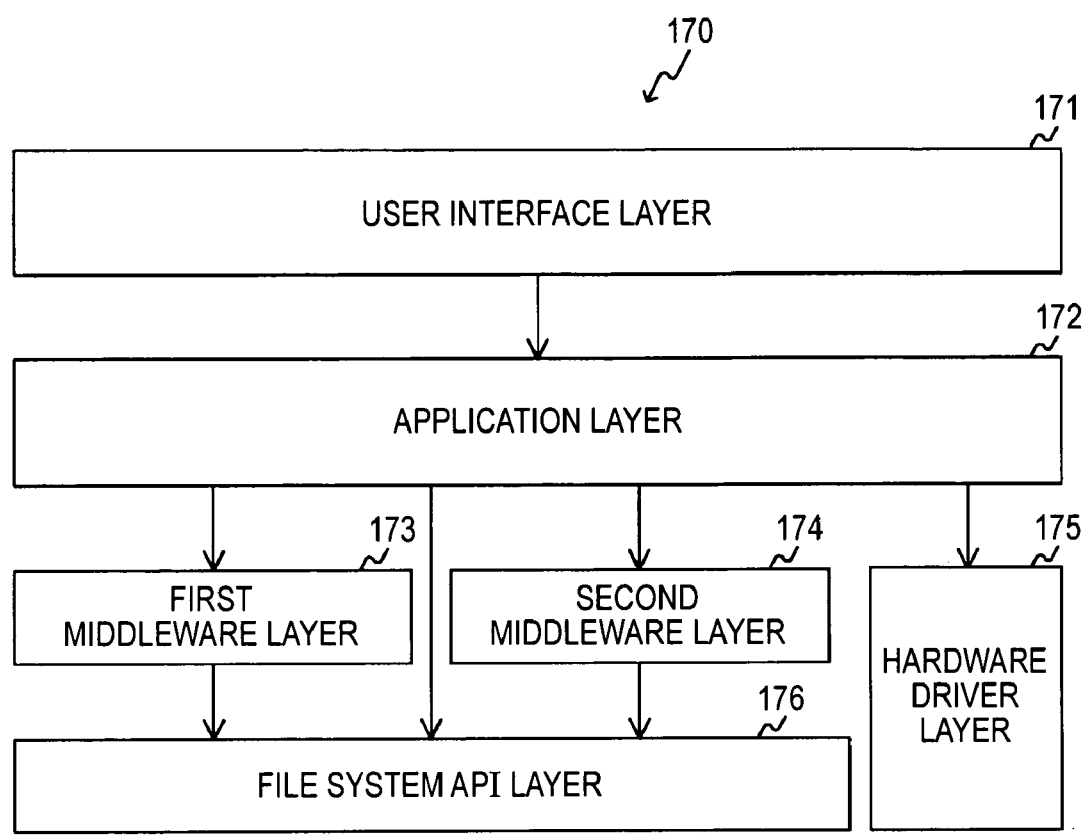
FIG. 3 is a diagram of the configuration of software related to the operation of the video recording apparatus 100.

The video recording apparatus 100 according to the present embodiment will now be described in terms of software. FIG. 3 shows the configuration of software 170 of the video recording apparatus 100 according to the present embodiment. It can be assumed that the hierarchy of the software 170 in the video recording apparatus 100 includes a user interface layer 171, an application layer 172, a first middleware layer 173, a second middleware layer 174, a hardware driver layer 175, and a file system API (application program interface) layer 176.

The user interface layer 171 transfers information between the user and the application layer 172.

The application layer 172 is related to application software designed for various operations concerning image capture by the video recording apparatus 100, display of captured images, and file management by the file management apparatus 160.

The first and second middleware layers 173 and 174 are related to software that runs on the operating system (OS) and provides more specific and higher functions than those of the application software and OS.

The hardware driver layer 175 is related to software for operating hardware, i.e., the video recording apparatus 100.

The file system API layer 176 includes a set of rules to define procedures of programs for the use of software to manage files (data) recorded on a recording medium. The content files 210 recorded on the recording medium 200 and the index file 220 are accessed through the file system API layer 176.

In the above-mentioned software configuration, assuming that the content files 210 can be accessed in the second middleware layer 174, the second middleware layer 174 can provide the respective functions of the inconsistency detection information generating unit 162, the recording status detecting unit 163, and the inconsistency detecting unit 164 in FIG. 2. In other words, in the second middleware layer 174, the inconsistency detection information can be generated, the recording status of the content files 210 recorded on the recording medium 200 can be detected, and whether the contents of the index file 220 are inconsistent with the recording status of the content files 210 can be determined on the basis of the inconsistency detection information and the recording status of the content files 210 on the recording medium 200.

On the other hand, assuming that the content files 210 cannot be accessed in the second middleware layer 174, the application layer 172 has to provide the respective functions of the inconsistency detection information generating unit 162, the recording status detecting unit 163, and the inconsistency detecting unit 164.

A method for managing the content files 210 through the file management apparatus 160 will now be described with reference to FIG. 4. According to the present embodiment, the file management apparatus 160 manages the content files 210 on the basis of the index file 220. The file management apparatus 160 according to the present embodiment can manage the content files 210 according to the directory structure on the file system in the recording medium 200 as shown in part B of FIG. 4. Alternatively, a virtual folder structure is established as shown in part A of FIG. 4 and the file management apparatus 160 may manage the content files 210 in the virtual folder structure independent of the directory structure shown in part B.

The index file 220 is recorded on the recording medium 200. The index file 220 and the content files 210 are managed in accordance with the predetermined file system. In other words, the file system manages information necessary to read the index file 220, e.g., information regarding the address of the recording position of the index file 220, that regarding the file name thereof, and that regarding the length thereof. As necessary, the system control unit 139 of the video recording apparatus 100 reads the index file 220 to obtain the index file 220 and allows the memory controller 138 to record the obtained file in the internal memory 137, thus holding the index file 220 in the memory 137. According to the present embodiment, therefore, the usability of the content files 210 recorded on the recording medium 200 can be improved using the index file 220.

The virtual folder structure based on the index file 220 in part A of FIG. 4 will now be described. In the file management apparatus 160 according to the present embodiment, it is assumed that the content files 210 are managed according to the virtual folder structure.

In the virtual folder structure in part A of FIG. 4, a plurality of folder entries FDE and a plurality of file entries FLE are hierarchically organized.

Each folder entry FDE is a virtual folder arranged in the index file 220. A folder entry can be provided according to user settings, e.g., every date, location, or type of captured image (i.e., landscape, portrait, animal, or building structure). The use of the folder entries can organize file entries or other folder entries. Consequently, the virtual folder structure can be constructed in the index file 220.

On the other hand, each file entry FLE corresponds to any of the content files 210 (i.e., any of files File1 to File5) on the file system shown in part B of FIG. 4. In the index file 220, when a content file 210 recorded on the recording medium 200 is entered as a file to be managed, an entry number to identify the entered content file 210 is assigned to the content file 210. In the index file 220, each content file 210 is handled as a file entry, serving as a file entered in the index file 220. Referring to part A of FIG. 4, the file entries FLE correspond to files entered in the index file 220. When a folder is set in the index file 220, an entry number is assigned to the folder. Each folder is managed as a folder entry in the index file 220. As mentioned above, the user can set a desired virtual folder in the index file 220 such that a desired content file 210 belongs to the virtual folder in the index file 220.

In the virtual folder structure in part A of FIG. 4, four folder entries FDE-A, FDE-B, FDE-C, and FDE-D are set. The parent folder entry FDE-A contains the two folder entries FDE-B and FDE-C in the lower level. The folder entry FDE-B contains two file entries FLE-1 and FLE-2. The folder entry FDE-C contains the folder entry FDE-D and a file entry FLE-3. The folder entry FDE-D contains two file entries FLE-4 and FLE-5.

Part B of FIG. 4 shows a real recording status of the content files 210 recorded on the recording medium 200. The content files 210 are managed according to the predetermined file system. The content files 210 are recorded on the recording medium 200 according to a predetermined directory structure. Referring to part B of FIG. 4, a root directory DirA contains two directories DirB and DirC. The directory DirB contains three files File1 to File3. The other directory DirC contains two files File4 and File5.

As mentioned above, those files, serving as the content files 210, are managed as file entries FLE in the index file 220. For example, the file entries FLE-1 and FLE-2 in the folder structure in part A of FIG. 4 correspond to the files File2 and File5 in the file system, respectively. The files File2 and File5 belong to the virtual folder entry FDE-B in the index file 220. The file entry FLE-3 corresponds to the file File1 in the file system. The file entries FLE-4 and FLE-5 correspond to the files File3 and File4 in the file system, respectively.

The above-mentioned virtual folder structure is created on application software. For instance, in the case where a directory structure is determined on the file system according to, e.g., a file operation rule, the user can create desired folders to classify and manage the content files 210 without manipulating the files in the file system.

Figure 5:
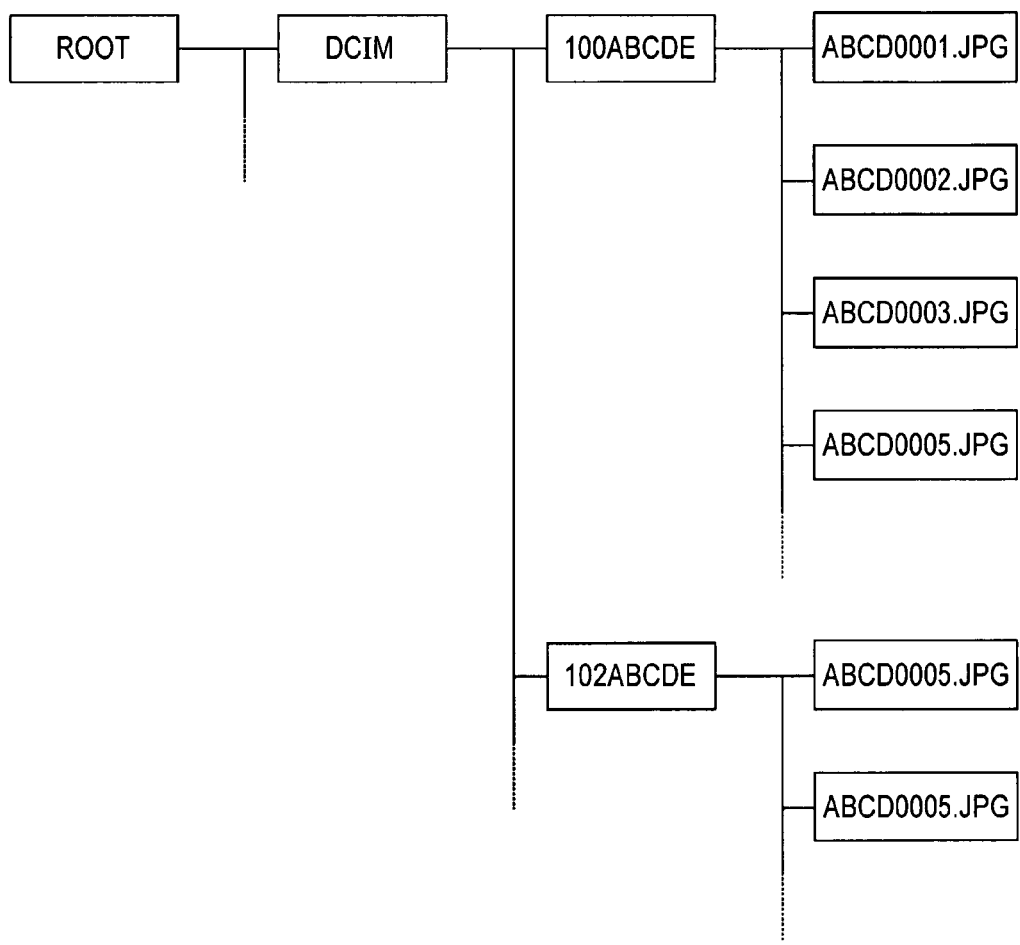
FIG. 5 shows an example of a directory structure upon recording the content files 210 on a recording medium 200.

As the file operation rule, e.g., the Design rule for Camera File system (DCF) can be used. The DCF is defined as a method for storing a file created through a digital camera. According to the DCF, image files can be shared between DCF-compatible devices. According to the DCF, the content files 210 are recorded on the recording medium 200 in a directory structure shown in FIG. 5. In the standard DCF directory structure, a DCF image root directory named "DCIM" is provided just below a root directory named "ROOT".

The DCF image root directory holds DCF directories to store still image data files. The directory name of each DCF directory includes eight characters. The first to third characters indicate a three-digit directory number from 100 to 999. The subsequent five characters are called a free string written using only one-byte uppercase alphanumeric characters. Directory numbers have to be assigned to respective directories so as not to overlap each other. Skipping a number is permitted.

Each DCF directory contains still image data files. Each file name includes eight characters. The first to fourth characters indicate a free string written using only one-byte uppercase alphanumeric characters. The subsequent four characters indicate a four-digit file number from 0001 to 9999. File numbers have to be assigned to respective files so as not to overlap each other. Skipping a number is permitted. In the case of the JPEG compression format for still image data, a file name extension is expressed as ".JPG". As mentioned above, according to the DCF, each content file 210, serving as a still image file, belongs to any of the directories.

The structure of the index file 220 will now be described. The structure of the index file 220 depends on the type of file to be managed. It is desirable that the structure of the index file 220 be the same as that of a file format for a file to be managed.

Before describing the structure of the index file 220, the structure of the content file 210 to be managed will now be explained with reference to FIG. 6. According to the present embodiment, the use of the QuickTime file format as a file format of the content file 210 will be described as an example. In the following description, a file recorded in the QuickTime file format will be called a QT movie file.

Figure 6:
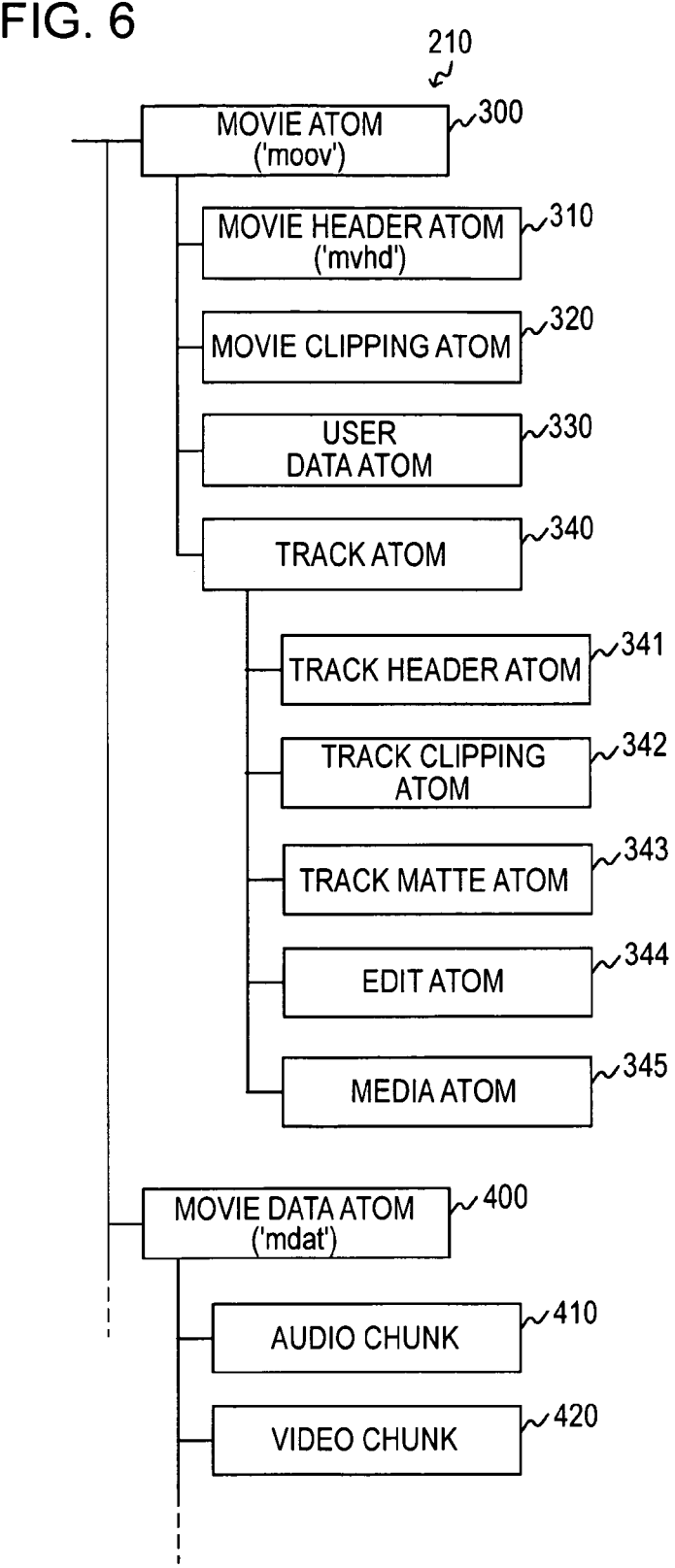
FIG. 6 shows an example of the structure of each content file 210.

FIG. 6 shows the structure of the content file 210 recorded in the QuickTime file format. The QuickTime file format is used to handle multimedia data. A basic data unit of a Quick-Time file is called an atom. Actual data, such as video data and audio data, is held in a data unit, called a movie data atom (type name: "mdat") 400. Information necessary to play back the movie data atom 400 is held in a data unit, called a movie atom (type name: "moov") 300.

The movie atom 300 contains information necessary to play back the corresponding movie data atom 400 in a hierarchical structure, i.e., a movie header atom 310, a movie clipping atom 320, a user data atom 330, and one or more track atoms 340.

The movie header atom 310 contains information regarding the entire corresponding QT movie file, e.g., the duration, time scale, and creation time of the corresponding movie. The movie clipping atom 320 specifies a clipping region. The user data atom 330 includes arbitrary information defined by the user. The track atoms 340 contain various types of data, such as sound, video, and text, in different tracks.

Each track atom 340 includes a track header atom 341 that contains information regarding an entire track (e.g., the number of pixels in video, sound volume, and creation time), a track clipping atom 342 that specifies a clipping region of the track, a track matte atom 343, an edit atom 344, and a media atom 345. In other words, the track atom 340 contains various data elements regarding the movie data atom 400.

For example, the media atom 345 includes information regarding actual data that is actually used in the track. In other words, the media atom 345 contains information regarding the entire of a media (i.e., a data structure that contains information that describes the data for a track in a movie in the QuickTime file format), information regarding media data handling, and information regarding the structure of the media. Actual data is divided into minimum units called samples. A collection of arbitrary number of samples is called a chunk. The media atom 345 contains information regarding the size of each sample, information regarding a first chunk field, and information regarding the duration of each sample.

Actual data, such as video data or audio data, stored in the movie data atom 400 may be linear data that is not subjected to compression coding or may be data subjected to compression coding according to a predetermined compression coding method. As for video data (image data), image data coded by a compression coding method according to a standard, such as MPEG-2 Video, Motion JPEG, Motion JPEG 2000, MPEG-4, or AVC (Advanced Video Coding: MPEG-4 Part 10), can be stored. As for audio data, audio data coded by a compression coding method according to a standard, such as MPEG-1 Audio Layer 2, Dolby AC-3 (Audio Code Number 3), or ATRAC (Advanced TRansform Acoustic Coding), can be stored. Video data and audio data coding methods are not particularly limited.

In addition, text data and actual data of an MIDI (Musical Instrument Digital Interface) file can be allocated to the movie data atom 400. In this case, text tracks and MIDI tracks are provided in the movie atom 300 on the basis of the structure of the movie data atom 400.

Figure 7:
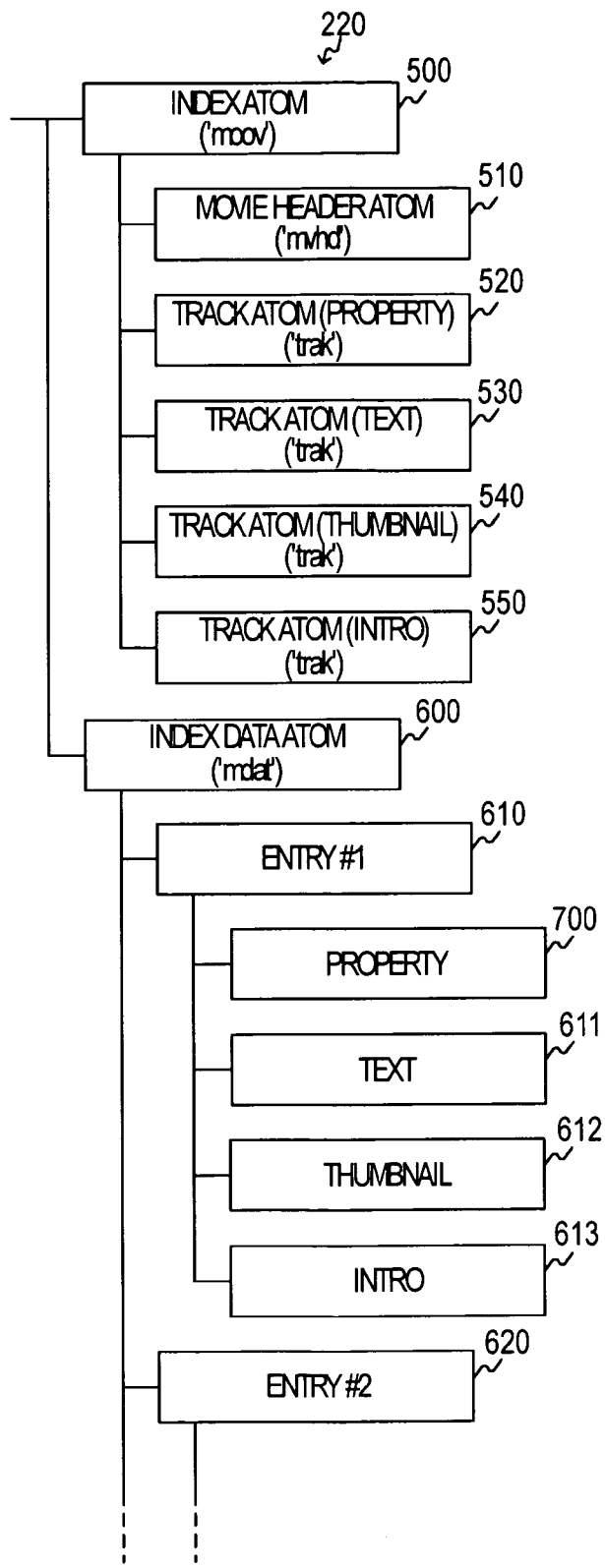
FIG. 7 shows an example of the structure of an index file 220.

FIG. 7 shows the structure of the index file 220 designed for the above-mentioned QT movie file. As shown in FIG. 7, the index file 220 includes an index atom 500 corresponding to the movie atom 300 of the QT movie file and an index data atom 600 corresponding to the movie data atom 400.

Information units to manage actual data allocated to the index data atom 600 are allocated as chunks to the index atom 500. On the other hand, management information units associated with the content files 210, serving as managed objects, recorded on the recording medium 200 are allocated to the index data atom 600. Each management information unit indicates the attributes of the corresponding content file 210 and the descriptions thereof. In the index file 220, the management information is used to manage the content files 210.

The management information may include several kinds of data items, e.g., a property, a text, a thumbnail picture, and an intro.

The index data atom 600 handles the content files 210, entered as managed files, as entries. In the case where the content files 210 corresponding to entries 610 and 620 are QT movie files, a property 700, a text 611, a thumbnail picture 612, and an intro 613 are allocated as chunks to each of the entries 610 and 620. The property 700 is an essential item of the index data atom 600. The text 611, the thumbnail picture 612, or the intro 613 is not provided depending on the type of content file 210 to be managed. For instance, when the content file 210 is a still image file including no audio information, the corresponding entry does not include the intro 613.

The property 700 serves as data indicative of the attributes of the corresponding content file 210 to be managed. Management information, serving as binary data, set in the content file 210 is allocated together with information to manage the entry to the property 700.

The text 611 comprises data indicative of a character string representing the title of the corresponding content file 210.

The thumbnail picture 612 comprises a still image indicative of the contents of the corresponding content file 210. For example, when the content file 210 includes moving image data, a first image can be allocated to the thumbnail picture 612. Alternatively, the user may select an image to be allocated to the thumbnail picture 612.

The intro 613 is audio data indicative of the contents of the corresponding content file 210 to be managed. For instance, audio data corresponding to several seconds (e.g., five seconds) after the start of playback of the corresponding content file 210 can be allocated to the intro 613. Alternatively, the user may select audio data to be allocated to the intro 613.

The index atom 500 will now be described. The index atom 500 includes a movie header atom 510, a property track atom 520 corresponding to the properties 700 in the index data atom 600, a text track atom 530 corresponding to the texts 611, a thumbnail track atom 540 corresponding to the thumbnail pictures 612, and an intro track atom 550 corresponding to the intros 613.

As in the case of the QT movie file, information regarding the entire index file 220 is allocated to the movie header atom 510 to control the property track atom 520, the text track atom 530, the thumbnail track atom 540, and the intro track atom 550. Positional information units associated with respective actual data blocks are allocated to each of the property track atom 520, the text track atom 530, the thumbnail track atom 540, and the intro track atom 550 in the order of entering the content files 210 in table form.

Figure 8:
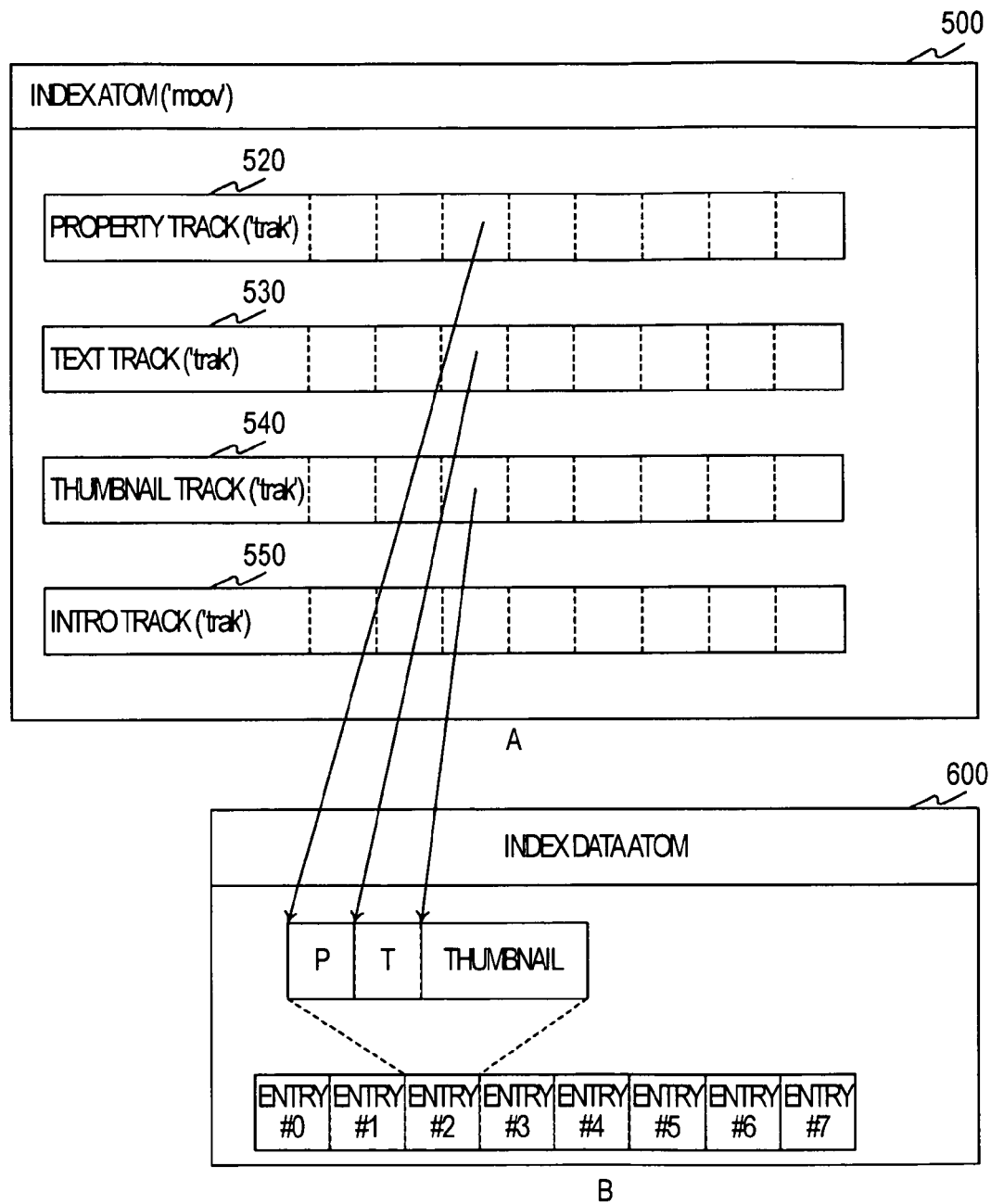
FIG. 8 shows the relationship between an index atom 500 and an index data atom 600 in the index file 220.

Referring to FIG. 8, in the index data atom 600, actual data blocks of respective management information units associated with the content files 210 are allocated to the respective entries. For example, a property P, a text T, a thumbnail picture are allocated as actual data blocks of the management information unit to an entry numbered 2 (entry #2). In the index atom 500, positional information units of the respective actual data blocks, i.e., the properties 700, the texts 611, the thumbnail pictures 612, and the intros 613, are allocated to the property track atom 520, the text track atom 530, the thumbnail track atom 540, and the intro track atom 550, respectively. The properties 700, the texts 611, the thumbnail pictures 612, and the intros 613 are allocated to the respective entries in the index data atom 600.

FIGS. 9A to 9D show examples of the positional information units of the actual data blocks allocated to the property track atom 520, the text track atom 530, the thumbnail track atom 540, and the intro track atom 550. In each of the property track atom 520, the text track atom 530, the thumbnail track atom 540, and the intro track atom 550, a relative byte position (RBP) relative to the start byte of each data (chunk), such as the property 700, the text 611, the thumbnail picture 612, or the intro 613, and the data length thereof are allocated every field name.

Referring to FIG. 10, each property 700 includes a property entry header 710, basic property data 740, and property extension data 750, serving as chunks. The property entry header 710 contains information necessary to manage the corresponding managed file in the hierarchical structure. The basic property data 740 contains basic attribute information segments about the corresponding content file 210, e.g., an information segment regarding the file format of the content file 210, that regarding the creation time thereof, that regarding the modification time thereof, and a file identifier. The property extension data 750 includes extended data of the basic property data 740.

FIG. 11 shows the structure of the property entry header 710. Referring to FIG. 11, the property entry header 710 includes an entry number 711, a parent entry number 712, property entry flags 720, a play order 713, an entry data size 714, and a next-extends-entry 715.

The entry number 711 is data to identify the corresponding entry. A unique code is given to the entry number 711. When a content file 210 (or a folder) to be managed is entered in the index file 220, a number that increases from zero can be assigned as an entry number 711 to the corresponding entry in order of entering the content files 210 in the index file 220. The entry number 711 specifies the corresponding managed content file 210. When an entry number is defined as a stepping number to be assigned in the entering order, a region for the entry number can be omitted. The parent entry number 712 indicates an entry number of an entry that the corresponding entry belongs to.

The property entry flags 720 set the attributes of the corresponding entry. FIG. 12 shows an example of the arrangement of the property entry flags 720. In the arrangement of FIG. 12, there are a flag 721 indicating whether the corresponding entry is original or favorite, a flag 722 indicating whether the entry is a folder or a file, a flag 723 indicating that the corresponding region is an extension region of the entry, a flag 724 indicating whether the entry is valid or invalid, a flag 725 indicating that the entered file refers to another file, a flag 726 indicating that the entered file is a child file, a flag 727 indicating that the entered file is a parent file, a flag 728 indicating whether the text included in the entry has an extended area, a flag 729 indicating whether the thumbnail picture included in the entry has an extended area, and a flag 731 indicating whether the intro included in the entry has an extended area.

Among them, the flag 722 indicating whether the corresponding entry is a file or a folder is assigned to a first bit. An entry related to a folder can be set by user settings.

The flag 724 indicates whether the corresponding entry is valid or invalid. According to the present embodiment, e.g., when one content file 210 is deleted, the corresponding flag 724 is switched so as to indicate that the content file 210 is invalid, thus modifying the contents of the index file 220.

As shown in FIG. 13, the basic property data 740 includes format brand information 741 indicating the file format of the corresponding content file 210, media profile information 742 regarding decoding, contents status flags 743, serving as flags related to the contents of the content file 210, creation time information 744, modification time information 745, duration information 746, a binary file identifier 747, referred counter information 748.

In the basic property data 740, the creation time information 745 indicates the creation time of the corresponding content file 210. The modification time information 746 indicates the modification time of the content file 210, e.g., the time when the content file 210 has been modified by editing. Inconsistency detection information units can be generated on the basis of the creation time information 745 and the modification time information 746, respectively.

The contents status flags 743 include a flag indicating whether the management information about the corresponding content file 210 includes a chunk corresponding to the title, a flag indicating whether the management information thereof includes a chunk corresponding to a thumbnail image, a flag indicating whether the management information thereof includes a chunk corresponding to an intro, and information indicative of the type of content (e.g., moving images, still images, or audio data).

The binary file identifier 747 describes the location of the corresponding content file 210. Referring to the binary file identifier 747, the directory which the corresponding content file 210 belongs to can be specified in the file system.

According to the present embodiment, as shown in FIG. 14A, the file names of the managed content files 210 recorded on the recording medium 200 or the folder names of the corresponding folders are allocated to the binary file identifiers 747, respectively. On the basis of the file name of the content file 210 allocated to the binary file identifier 747, one of the inconsistency detection information units can be generated.

When the location of each file is not displayed in the region for the binary file identifiers 747, the location of each file is described in the property extension data 750 (see FIG. 10) included in the corresponding property 700 in the index data atom 600. In the case where the property extension data 750 describes the location of the corresponding content file 210, the location is expressed as URL (Uniform Resource Locator).

Figure 14B:
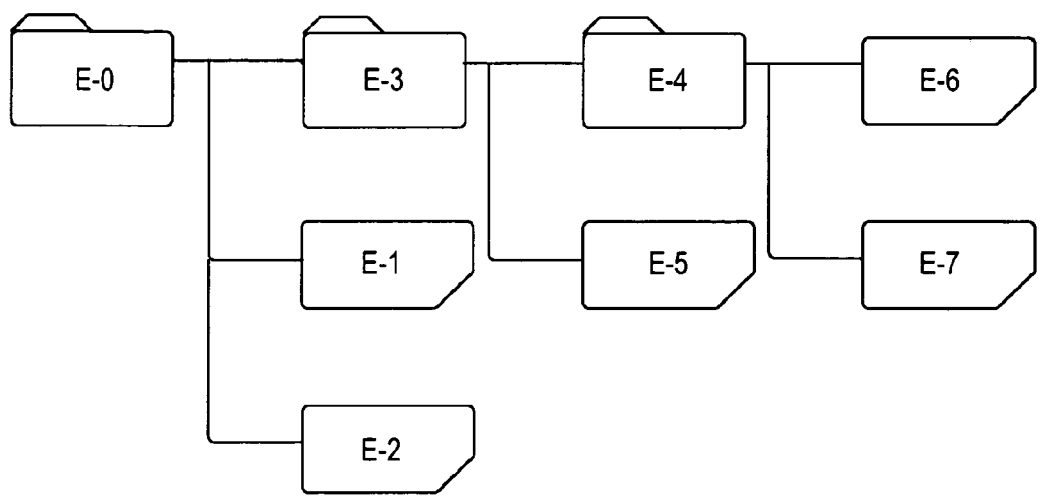

In the above-mentioned index file 220, the content files 210 are arranged as entries in a virtual folder structure as shown in FIGS. 14A and 14B using the entry numbers 711 of the content files 210, the property entry flags 720, the parent entry numbers 712, the binary file identifiers 747, or the URLs described in the property extension data segments 750 included in the properties 700 in the index data atom 600.

Table of FIG. 14A shows the entry numbers 711 of the respective entries in the folder structure shown in part A of FIG. 4, the flags 722 each indicating whether the corresponding entry is a file or a folder, the parent entry numbers 712, and the binary file identifiers 747 or the URLs.

Referring to FIG. 14A, the index file 220 includes the entries numbered 0 to 7. As shown by the flags 722, the entries numbered 0, 3, and 4 are folder entries. On the other hand, the entries numbered 1, 2, 5, 6, and 7 are file entries.

Each parent entry number 712 indicates the parent entry that the corresponding entry belongs to. Each binary file identifier 747 relates the file entry to the corresponding content file 210 recorded on the recording medium 200 using a file name.

On the basis of the above-mentioned structure of the index file 220, a folder structure is constructed as shown in FIG. 14B. In other words, in FIG. 14B, according to the index file 220, the virtual folder structure is established independent of the directory structure in the file system. In this folder structure, a folder entry E-0 contains a folder entry E-3 and file entries E-1 and E-2 in the lower level. The folder entry E-3 contains a folder entry E-4 and a file entry E-5 in the lower level. The folder entry E-4 contains file entries E-6 and E-7 in the lower level.

Inconsistency detection information will now be described with reference to FIG. 15. The inconsistency detection information is used to determine whether the contents of the index file 220 are inconsistent with the recording status of the content files 210 actually recorded on the recording medium 200. The inconsistency detection information can be provided in, e.g., the header of the index file 220. In the above-mentioned structure of the index file 220 for the QT movie files, the inconsistency detection information can be allocated to the movie header atom 510.

FIG. 15 shows an example of the structure of inconsistency detection information 800 according to the present embodiment of the present invention. When the content files 210 are recorded on the recording medium 200 in the directory structure according to the predetermined file system, the inconsistency detection information 800 is provided every directory in the file system.

Referring to FIG. 15, the inconsistency detection information 800 includes three kinds of inconsistency detection information units, i.e., inconsistency detection information 810 about the total number of files for each directory, a modification time checksum 820, and a file name checksum 830. The inconsistency detection information 810 concerns the total number of content files 210 included in the corresponding directory. The modification time checksum 820 indicates inconsistency detection information regarding the modification times of the respective content files 210 in the corresponding directory. The modification time checksum 820 is generated from values corresponding to the respective modification times. The file name checksum 830 indicates inconsistency detection information regarding the names of the content files 210 in the corresponding directory. The file name checksum 830 is generated from values corresponding to the respective file names.

The inconsistency detection information units 800 in FIG. 15 correspond to the directories in part B of FIG. 4. The inconsistency detection information 810 regarding the total number of content files 210 (hereinafter, referred to as total-files information 810), the modification time checksum 820, and the file name checksum 830 are provided every directory, i.e., in each of the directory DirA, the directory DirB (DirA/DirB), and the directory DirC (DirA/DirC) on the file system in part B of FIG. 4. The directories DirB and DirC belong to the directory DirA.

The above-mentioned inconsistency detection information units 810 to 830 are provided on the assumption that an inconsistency between the contents of the index file 220 and the recording status of the content files 210 on the recording medium 200 will occur due to a file operation directly performed in the file system by the user. In other words, the use of the total-files information units 810 effectively detects an inconsistency that occurs when the user directly adds or deletes a content file 210 in the file system. The use of the modification time checksums 820 effectively detects an inconsistency that occurs when the user overwrites or edits a content file 210 in the file system or when the user adds or deletes a content file 210. The use of the file name checksums 830 effectively detects an inconsistency that occurs when the user directly changes the file name of a content file 210 in the file system or when the user adds or deletes a content file 210.

The kinds of inconsistency detection information units 800 are not limited to the above-mentioned examples. One or two kinds of inconsistency detection information units may be held as necessary. In addition, another kind of inconsistency detection information unit may be further held.

As another kind of inconsistency detection information unit, e.g., information regarding the creation time of the content file 210 that is the most recently created one of the content files 210 contained in the corresponding directory or information concerning the modification time of the content file 210 that is the last modified file in the directory may be used. This information may be data indicative of the creation time of the file or the modification time thereof. Alternatively, the information may be a checksum obtained from the corresponding data. Consequently, when an inconsistency occurs between the contents of the index file 220 and the recording status of the content files 210 on the recording medium 200 due to the addition or editing of the content file 210 to be managed, the inconsistency can be detected at high speed.

The inconsistency detection information units 810 to 830 are generated by the inconsistency detection information generating unit 162 (see FIG. 2) and are then stored in, e.g., the header of the index file 220. When a content file 210 is added, deleted, or edited, the contents of the index file 220 are updated through the software 170 of the file management apparatus 160. Simultaneously, the inconsistency detection information 800 is updated in accordance with the management information associated with the added, deleted, or edited content file 210.

A method for generating the inconsistency detection information 800 will now be described.

In the inconsistency detection information 800, the total-files information 810 indicates the number of content files 210 included in the corresponding directory in the file system. For instance, in the file system shown in part B of FIG. 4, the directory DirA contains the lower-level directories DirB and DirC but does not include a content file 210. As shown in FIG. 15, therefore, the total-files information 810 about the directory DirA indicates "0". Similarly, since the directory DirB includes three files File1, File2, and File3, the total-files information 810 about the directory DirA/DirB indicates "3". Similarly, since the directory DirA/DirC includes two files File4 and File5, the total-files information 810 about the directory DirA/DirC indicates "2".

The total-files information 810 is updated at the time when a content file 210 is added to (i.e., recorded on) or deleted from the recording medium 200. In other words, when a content file 210 is added to the recording medium 200, the number of files in the corresponding directory is increased by one. When any one of the managed content files 210 is deleted from the recording medium 200, the number of files in the directory which the deleted content file 210 belonged to is reduced by one. When an arbitrary content file 210 is modified by editing, the number of files recorded on the recording medium 200 is not changed. Accordingly, the total-files information 810, serving as the inconsistency detection information 800, is not updated.

The modification time checksum 820 will now be described. The modification time checksum 820 is generated every directory in the file system. Each modification time checksum 820 is generated on the basis of the modification times of all of the files included in the corresponding directory. The generation of the modification time checksum 820 will be described in detail with reference to FIG. 16.

Figure 16:
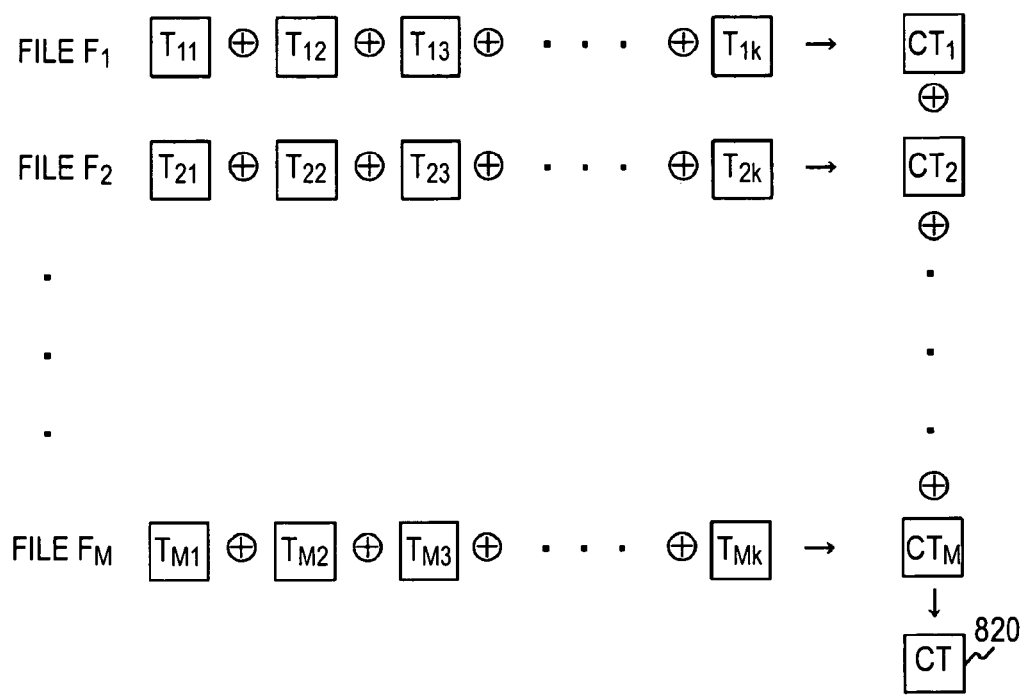
FIG. 16 shows an example of a method for generating a modification time checksum 820 included in the inconsistency detection information 800.

It is assumed that when the number of files included in an arbitrary directory in the file system is M, the content files 210 in the directory are set to files $F_1, F_2, \ldots,$ and $F_M$ as shown in FIG. 16. When the byte length of modification time data associated with each content file 210 is k, the sequence of k bytes corresponding to the modification time data associated with, e.g., the file $F_M$ can be expressed by $T_{M1}, T_{M2}, \ldots, T_{Mk}$.

When the file format of the recording medium 200 is, e.g., UDF (Universal Disk Format), the modification time data associated with each content file 210 includes a data segment named "timezone", that named "year", that named "month", that named "day", that named "hour", that named "min", that named "sec", that named "centisec", that named "microsec100", and that named "microsec". Two bytes are assigned to each of the data segment "timezone" and that "year". One byte is assigned to each of the other data segments. The sequence of bytes corresponding to the modification time data of each UDF file can be expressed by $T_{i1}, T_{i2}, \ldots, T_{i12}$.

A bit string generated from the sequence of bytes corresponding to the modification time data is obtained every content file 210 included in each target directory. In other words, as for the file $F_M$ in FIG. 16, a bit string is generated by taking the exclusive OR of values constituting respective data segments included in the bytes corresponding to the modification time data of the file $F_M$. The bit string is expressed by $CT_M$. For instance, as for each UDF file shown in FIG. 16, a bit string $CT_i$ of one byte generated from the modification time data of one file is obtained by taking the exclusive OR of the bytes $T_{i1}, T_{i2}, \ldots, T_{i12}$.

Further, a modification time checksum CT of each target directory is generated by taking the exclusive ORs of the bit strings indicative of the modification times of the respective files (refer to FIG. 16).

When a content file 210 to be recorded on the recording medium 200 is added or the content file 210 is deleted from or modified in the recording medium 200, the value of the modification time checksum 820 is simultaneously updated.

When the content file 210 is added to the recording medium 200, the modification time checksum 820 of the directory containing the added content file 210 is obtained by taking the exclusive OR of the bit string constituting the original checksum and a bit string generated from the modification time data of the added content file 210.

When the content file 210 is deleted from the recording medium 200, the modification time checksum 820 of the directory in which the content file 210 is deleted is obtained by taking the exclusive OR of the bit string constituting the original checksum and a bit string generated from the modification time data of the deleted file.

When the contents of the content file 210 recorded on the recording medium 200 are modified, the modification time checksum 820 of the directory including the modified content file 210 is newly obtained by taking the exclusive OR of the bit string constituting the original checksum, a bit string generated from the modification time data of the content file 210 before the modification, and a bit string generated from the modification time data of the modified content file 210.

Figure 18:
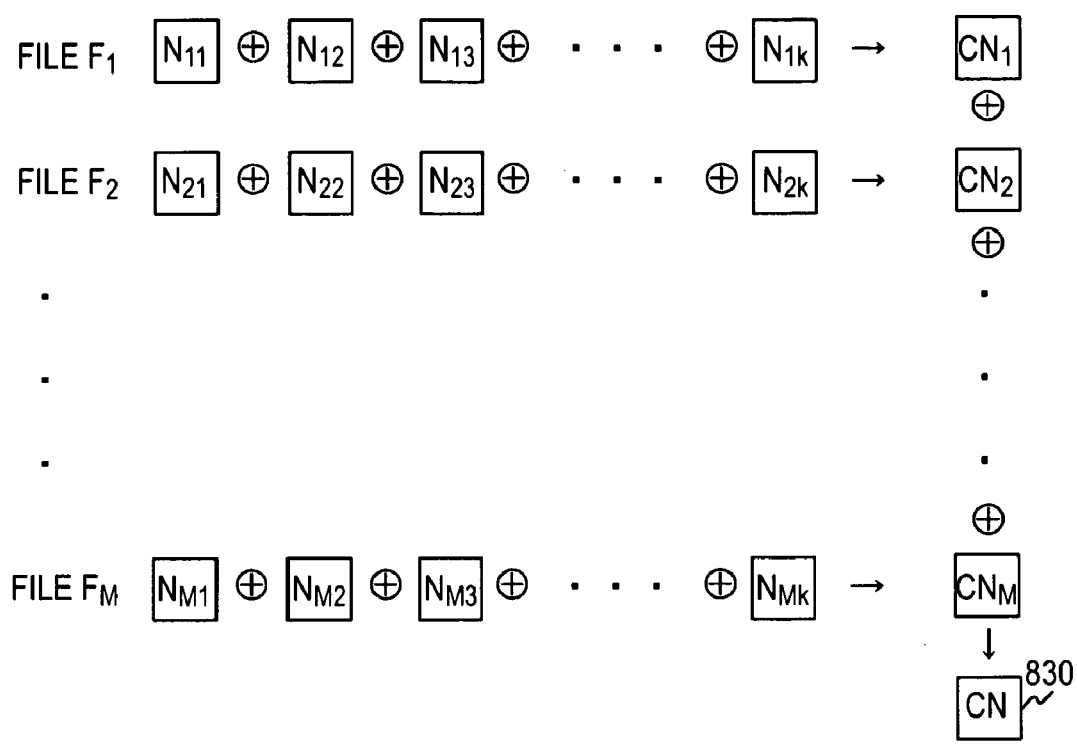
FIG. 18 shows an example of a method for generating a file name checksum 830 included in the inconsistency detection information 800.

The file name checksum 830 will now be described with reference to FIG. 18. Each file name checksum 830 is generated on the basis of the names of the managed content files 210 included in the corresponding directory in the file system.

When the number of content files 210 included in an arbitrary directory in the file system is M, the content files 210 in the directory are set to files $F_1, F_2, \ldots,$ and $F_M$. When the byte length of file name data associated with each content file 210 is k, the sequence of k bytes corresponding to the file name data associated with, e.g., the content file $F_M$ can be expressed by $N_{M1}, N_{M2}, \ldots, N_{Mk}$. A bit string generated from the sequence of bytes corresponding to the file name data is obtained every content file 210. In other words, as for the file $F_M$ in FIG. 18, a bit string is generated by taking the exclusive OR of values constituting respective data segments included in the bytes corresponding to the file name data of the file $F_M$. The bit string is expressed by $CN_M$.

Further, a file name checksum CN (830) of a target directory is generated by taking the exclusive OR of generated bit strings of the respective content file 210.

When a content file 210 is added to, deleted from, or modified in the recording medium 200, the file name checksum 830 is simultaneously updated.

When a content file 210 to be managed is added to the recording medium 200, the file name checksum 830 of the directory containing the added content file 210 is newly obtained by taking the exclusive OR of the bit string constituting the original checksum and a bit string generated from the file name data of the added content file 210.

When the content file 210 is deleted from the recording medium 200, the file name checksum 830 of the directory in which the content file 210 is deleted is obtained by taking the exclusive OR of the bit string constituting the original checksum and a bit string generated from the file name data of the deleted file.

When the contents of any of the content files 210 recorded on the recording medium 200 are modified, the name of the modified content file 210 is not changed. Accordingly, the file name checksum 830 is not changed. In other words, the file name checksum 830 of the directory containing the modified content file 210 is the same as that obtained from the original bit strings.

When a new directory is added to the recording medium 200, items (i.e., inconsistency detection information units) corresponding to the new directory are added to the existing inconsistency detection information 800. Each of the total-files information 810, the modification time checksum 820, and the file name checksum 830 associated with the added directory are set to "0".

On the other hand, when an arbitrary directory is deleted from the recording medium 200, the items corresponding to the deleted directory are deleted from the existing inconsistency detection information 800. When the name of an arbitrary directory is changed, the corresponding directory name in the inconsistency detection information 800 is changed.

The operation of the file management apparatus 160 according to the present embodiment of the present invention will now be described with reference to FIG. 19.

Figure 19:
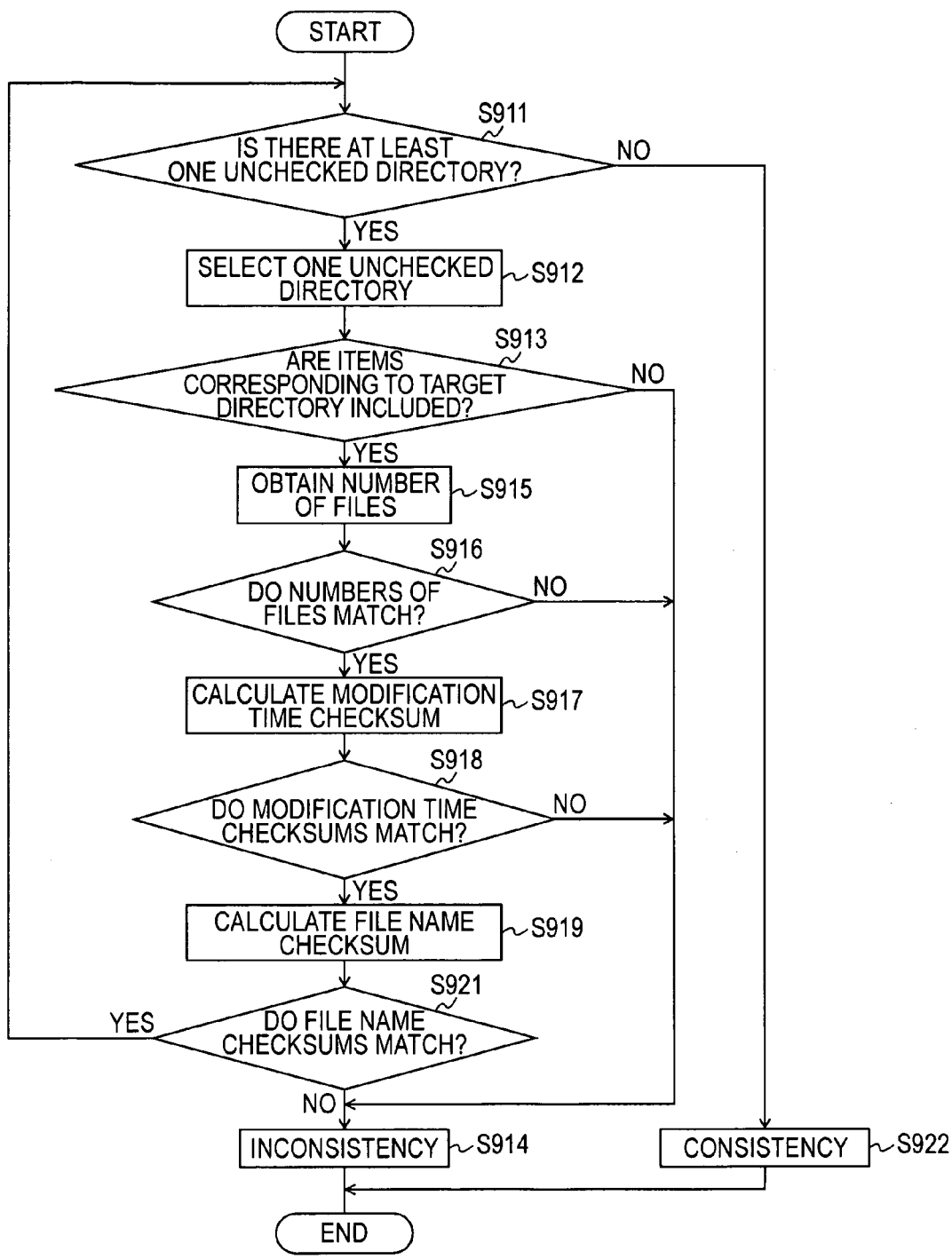
FIG. 19 is a flowchart of an inconsistency detecting process executed by the file management apparatus 160.

FIG. 19 shows an inconsistency detecting process executed by the file management apparatus 160 according to the present embodiment of the present invention. When the inconsistency detecting process is started, whether there is at least one directory that is not checked for inconsistency (i.e., unchecked directory) in the file system is determined (step S911).

Checking directories for inconsistency means determining whether the recording status of the content files 210 included in the directory to be checked is inconsistent with the contents of the index file 220 according to the following steps, i.e., S912 to S922.

When there are unchecked directories, one of the directories is selected (step S912).

When it is determined that the inconsistency detection information 800 held in the index file 220 includes items corresponding to the selected directory (i.e., target directory) (YES in step S913), the recording status detecting unit 163 obtains the total number of content files 210 in the target directory from the file system in the recording medium 200 (step S915).

If the inconsistency detection information 800 does not include the items corresponding to the target directory (NO in step S913), this means that the index file 220 does not manage at least one content file 210 contained in the target directory. The inconsistency detecting unit 164 determines that an inconsistency exists between the contents of the index file 220 and the recording status of the content files 210. The inconsistency detecting process then terminates (step S914).

On the other hand, when it is determined that the numbers of content files 210 match (YES in step S916), the recording status detecting unit 163 obtains data regarding the modification times of all of the content files 210 contained in the target directory from the file system. The inconsistency detecting unit 164 calculates a checksum regarding the modification times in the foregoing manner (step S917).

The inconsistency detecting unit 164 compares the obtained checksum with the modification time checksum 820 about the target directory included in the inconsistency detection information 800. If the checksums do not match (NO in step S918), it is determined that the contents of the index file 220 are inconsistent with the recording status of the content files 210 on the recording medium 200. The inconsistency detecting process then terminates (step S914).

On the other hand, when the modification time checksums match (YES in step S918), the recording status detecting unit 163 obtains the names of all of the content files 210 contained in the target directory from the file system.

The inconsistency detecting unit 164 calculates a checksum regarding the file names obtained by the recording status detecting unit 163 in the foregoing manner (step S919) and then compares the obtained checksum with the file name checksum 830, associated with the target directory, included in the inconsistency detection information 800. If the file name checksums do not match (NO in step S921), it is determined that the contents of the index file 220 are inconsistent with the recording status of the content files 210. The inconsistency detecting process then terminates (step S914).

On the other hand, if the file name checksums match (YES in step S921), the process is returned to step S911. The process is continued until all of the directories are subjected to the above-mentioned inconsistency detecting process. When the inconsistency detecting process for each of the directories is completed (NO in step S911), it is determined that the contents of the index file 220 are consistent with the recording status of the content files 210 on the recording medium 200 (step S922) and the process then terminates.

When an inconsistency is detected between the contents of the index file 220 and the recording status of the content files 210 on the recording medium 200, a specified directory having an inconsistent portion and the file containing the directory are corrected, i.e., the corresponding portion in the index file 220 and the corresponding inconsistency detection information 800 are corrected so that the contents of the index file 220 are consistent with the recording status of the content files 210 on the recording medium 200. In this instance, after the index file 220 and the inconsistency detection information 800 are corrected, the inconsistency detecting process may be restarted, i.e., the process may be performed to unchecked directories. Alternatively, even when a directory having an inconsistent portion is detected, the inconsistency detecting process may be continuously performed to unchecked directories until all of the directories each having an inconsistent portion are specified.

As mentioned above, according to the present embodiment of the present invention, upon determining whether an inconsistency exists between the contents of the index file 220 and the recording status of the content files 210 on the recording medium 200, the inconsistency can be detected on the basis of the inconsistency detection information 800 at high speed without checking management information about each of the content files 210 included in the index file 220 against the corresponding content file 210.

According to the present embodiment, since the inconsistency detection information 800 is provided every directory containing the content files 210, whether an inconsistency exists can be determined every directory on the basis of the inconsistency detection information. Since inconsistency checking is performed every directory, even if the number of content files 210 is large, a process of, e.g., obtaining the number of files or calculating a creation time checksum or a modification time checksum can be performed at high speed.

The inconsistency detection information 800 includes the total-files information 810 for each directory in the file system. Therefore, even if an inconsistency between the contents of the index file 220 and the recording status of the content files 210 on the recording medium 200 occurs upon the addition or deletion of a content file 210, the inconsistency can be detected at high speed. In many cases, the inconsistency therebetween may occur upon adding or deleting a content file 210 or changing the name thereof. Accordingly, whether an inconsistency exists is checked on the basis of the total-files information 810 before checking based on other inconsistency detection information units. Consequently, whether an inconsistency exists can be determined at high speed.

In addition, the inconsistency detection information 800 includes the modification time checksum 820 associated with the content files 210 contained in each directory in the file system. Even when an inconsistency between the contents of the index file 220 and the recording status of the content files 210 on the recording medium 200 occurs upon adding, deleting, overwriting, or editing a content file 210 on the recording medium 200, the inconsistency can be detected at high speed.

Further, the inconsistency detection information 800 includes the file name checksum 830 associated with the content files 210 included in each directory in the file system. Even when an inconsistency between the contents of the index file 220 and the recording status of the content files 210 on the recording medium 200 occurs upon adding or deleting a content file 210 on the recording medium 200 or changing the name of a content file 210, the inconsistency can be detected at high speed.

According to the present embodiment, the file management apparatus 160 includes the inconsistency detection information generating unit 162 for generating inconsistency detection information, i.e., the total-files information 810, the modification time checksum 820, and the file name checksum 830 from management information units about respective content files 210 every directory. Accordingly, in addition to the generation of inconsistency detection information, even when a content file 210 is added to or deleted from the recording medium 200 or when the name of a content file 210 is changed, the inconsistency detection information 800 can be updated in response to the addition, deletion, or change.

The inconsistency detecting unit 164 determines, on the basis of the three kinds of inconsistency detection information units 800, i.e., the total-files information 810, the modification time checksum 820, and the file name checksum 830, whether an inconsistency exists between the contents of the index file 220 and the recording status of the content files 210 on the recording medium 200. Therefore, the precision of determination can be increased.

It will be apparent that the present invention is not limited to the above-mentioned embodiment but many modifications and variations are possible without departing from the spirit and scope of the present invention. For instance, according to the above-mentioned embodiment, to manage the content files 210 on the basis of the index file 220, the content files 210 are managed in the virtual folder structure. The content files 210 may be managed in the directory structure on the file system. It is unnecessary to specially construct the virtual folder structure.

According to the above-mentioned embodiment, the file management apparatus 160 manages the content files 210, which have been recorded on the recording medium 200 through the video recording apparatus 100. The file management apparatus according to the embodiment of the present invention is not limited to this example. The file management apparatus according to the embodiment of the present invention can be applied to any apparatus for recording a file on a recording medium.

According to the above-mentioned embodiment, the QuickTime file format is used as the file format of the content file 210. The file format of a file to be managed in the file management apparatus according to the embodiment of the present invention is not limited to this example. In addition, the file management apparatus 160 according to the embodiment has the index file 220 having the same file format structure as that of the content files 210. The structure of the index file according to the embodiment of the present invention is not limited to this example. So long as the index file includes management information partially extracted from the contents of the managed files, the structure of the index file may be properly modified.

According to the above-mentioned embodiment, in the inconsistency detecting process, checking for inconsistency based on the total-files information 810 (step S916), that based on the modification time checksum 820 (step S918), and that based on the file name checksum 830 (step S921) are performed in that order. The order of steps is not limited to this example. The order of steps may be properly changed.

According to the embodiment, the inconsistency detecting unit 164 calculates a modification time checksum and a file name checksum on the basis of the recording status of the content files 210 detected by the recording status detecting unit 163. The functions of the units are not limited to this example. For instance, the recording status detecting unit 163 may detect the recording status of the content files 210 and simultaneously generate checksums on the basis of the recording status so that the generated checksums can be compared with the inconsistency detection information 800.

The above-mentioned embodiment of the present invention shows an example to embody the present invention. It should be understood by those skilled in the art that various modifications, combinations, sub-combinations and alterations may occur depending on design requirements and other factors insofar as they are within the scope of the appended claims or the equivalents thereof.

Steps of the inconsistency detecting process explained in the above-mentioned embodiment of the present invention may be regarded as a method including a series of steps. In addition, the series of steps may be regarded as a program that allows a computer to execute the steps and a recording medium storing the program.

What is claimed is:

1. A file management apparatus for managing content files recorded on a recording medium, based on an index file including management information about the content files, the apparatus comprising:

management status information holding means for holding, in the index file, at least two management status information units indicative of a management status of the content files, the content files having been recorded in at least one directory on the recording medium, one of the at least two management status information units being a modification time checksum of the at least one directory;

recording status detecting means for detecting at least two recording statuses of the content files recorded on the recording medium, one of the at least two recording statuses including modification times of the content files in the at least one directory; and inconsistency detecting means for detecting an inconsistency between the management information and a recording status of the content files based on the modification time checksum of the at least one directory held in the index file, which was read from the recording medium, and the modification times detected from a file system by the recording status detecting means and based on an other of the at least two management status information units and an other of the at least two recording statuses, wherein the other of the at least two management status information units is information indicating a number of the content files in the at least one directory, and the other of the at least two recording statuses is a total number of files in the at least one directory from the file system.

2. The apparatus according to claim 1, wherein the management status information holding means holds management status information about the content files for every directory.

3. The apparatus according to claim 2, wherein the management status information includes information regarding a number of the content files included in each of the at least one directory.

4. The apparatus according to claim 2, wherein the management status information includes information regarding names of the content files included in each of the at least one directory.

5. The apparatus according to claim 4, wherein the information regarding the names of the content files is a checksum for each of the at least one directory, the checksum being generated based on the names of the content files included in each of the at least one directory.

6. The apparatus according to claim 2, wherein the management status information includes information regarding a creation time of a most recently created of the content files in each of the at least one directory.

7. The apparatus according to claim 2, wherein the management status information includes information regarding a modification time of a last modified of the content files in each of the at least one directory.

8. The apparatus according to claim 1, wherein the modification time checksum is generated based on modification times of the content files included in each of the at least one directory.

9. The apparatus according to claim 1, further comprising:

management status information generating means for generating management status information from the management information.

10. The apparatus according to claim 9, wherein the management status information generating means generates the management status information about the content files for every directory.

11. The apparatus according to claim 9, wherein the management information is generated from the content files recorded on the recording medium.

12. The apparatus according to claim 11, wherein the management status information is generated from the management information.

13. The apparatus according to claim 11, wherein the management status information is generated from the management information included in the index file.

14. The apparatus according to claim 11, wherein the at least two management status information units includes information regarding a number of the content files managed in the index file or information regarding names of the content files.

15. A file management method, implemented by a file management apparatus for managing content files recorded on a recording medium, based on an index file including management information about the content files, the method comprising:

previously holding, in the index file, at least two management status information units indicative of a management status of the content files, the content files having been recorded in at least one directory on the recording medium, one of the at least two management status information units being a modification time checksum of the at least one directory;

detecting at least two recording statuses of the content files recorded on the recording medium, one of the at least two recording statuses including modification times of the content files in the at least one directory; and detecting, using a processor of the file management apparatus, an inconsistency between the management information and a recording status of the content files based on the modification time checksum of the at least one directory held in the index file, which was read from the recording medium, and the modification times detected from a file system and based on an other of the at least two management status information units and an other of the at least two recording statuses, wherein the other of the at least two management status information units is information indicating a number of the content files in the at least one directory, and the other of the at least two recording statuses is a total number of files in the at least one directory from the file system.

16. A computer-readable storage medium encoded with instructions which when executed by a computer causes the computer to implement a method for managing content files recorded on a recording medium, based on an index file including management information about the content files, the method comprising:

previously holding, in the index file, at least two management status information units indicative of a management status of each of the content files, the content files having been recorded in at least one directory on the recording medium, one of the at least two management status information units being a modification time checksum of the at least one directory;

detecting at least two recording statuses of the content files recorded on the recording medium, one of the at least two recording status including modification times of the content files in the at least one directory; and detecting an inconsistency between the management information and a recording status of the content files based on the modification time checksum of the at least one directory held in the index file, which was read from the recording medium, and the modification times detected from a file system and based on an other of the at least two management status information units and an other of the at least two recording statuses, wherein the other of the at least two management status information units is information indicating a number of the content files in the at least one directory, and the other of the at least two recording statuses is a total number of files in the at least one directory from the file system.

17. A file management apparatus for managing content files recorded on a recording medium, based on an index file including management information about the content files, the apparatus comprising:
  a management status information holding unit configured to hold, in the index file, at least two management status information units indicative of a management status of the content files, the content files having been recorded in at least one directory on the recording medium, one of the at least two management status information units being a modification time checksum of the at least one directory;
  a recording status detecting unit configured to detect at least two recording statuses of the content files recorded on the recording medium one of the at least two recording statuses including modification times of the content files in the at least one directory; and
  an inconsistency detecting unit configured to detect an inconsistency between the management information and a recording status of the content files based on the modification time checksum of the at least one directory held in the index file, which was read from the recording medium, and the modification times detected from a file system by the recording status detecting unit and based on an other of the at least two management status information units and an other of the at least two recording statuses, wherein the other of the at least two management status information units is information indicating a number of the content files in the at least one directory, and the other of the at least two recording statuses is a total number of files in the at least one directory from the file system.

* * * * *